United States Patent
Joye et al.

(10) Patent No.: US 11,451,094 B2
(45) Date of Patent: *Sep. 20, 2022

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Andries Van Wageningen, Wijlre (NL); Simon George Abernethy, Eindhoven (NL); Klaas Jacob Lulofs, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 19 days.

This patent is subject to a terminal disclaimer.

(21) Appl. No.: 16/922,226

(22) Filed: Jul. 7, 2020

(65) Prior Publication Data

US 2020/0343773 A1    Oct. 29, 2020

Related U.S. Application Data

(63) Continuation of application No. 15/849,873, filed on Dec. 21, 2017, now Pat. No. 10,734,843, which is a (Continued)

(30) Foreign Application Priority Data

Jun. 19, 2014 (EP) ..................... 14173120

(51) Int. Cl.
*H02J 50/12* (2016.01)
*H02J 50/60* (2016.01)
(Continued)

(52) U.S. Cl.
CPC .............. *H02J 50/12* (2016.02); *H02J 50/10* (2016.02); *H02J 50/60* (2016.02); *H02J 50/80* (2016.02);
(Continued)

(58) Field of Classification Search
CPC .. H02J 50/12; H02J 50/10; H02J 50/90; H02J 50/60; H02J 50/80; H04B 5/0087; H04B 5/0075; H04B 5/0037
See application file for complete search history.

(56) References Cited

U.S. PATENT DOCUMENTS 5,349,173 A    9/1994    Scheckel
6,476,708 B1    11/2002    Johnson
(Continued)

FOREIGN PATENT DOCUMENTS

DE    102009037168 A1    2/2011
EP    2251817 A    11/2010
(Continued)

OTHER PUBLICATIONS

"Wireless Power Consortium", Downloaded From http://www.wirelesspowerconsortium.com/index.html on Mar. 18, 2014, 2 pages.
(Continued)

*Primary Examiner* — Pinping Sun

(57) ABSTRACT

A wireless power transfer system includes a power transmitter (201) arranged to provide a power transfer to a power receiver (205) via a power transfer signal. The power receiver (205) comprises a first mode controller (709) for transmitting a standby mode exit request to the power transmitter (201) by changing a loading of a communication inductor (209) of the power transmitter (201). The power transmitter (201) comprises a mode controller (405) which controls the power transmitter (201) to operate in a standby mode wherein a presence of the power receiver (205) is detected but no power transfer signal is generated. It furthermore comprises a detector (403) for detecting an impedance change of the communication inductor (209). The mode controller (405) is arranged to initiate a transition from
(Continued)

the standby mode to a power transfer mode in response to the detector (403) detecting the impedance change.

8 Claims, 23 Drawing Sheets

Related U.S. Application Data continuation of application No. 15/306,575, filed as application No. PCT/EP2015/063254 on Jun. 15, 2015, now Pat. No. 9,866,073.

(51) Int. Cl.
  *H02J 50/90*     (2016.01)
  *H02J 50/80*     (2016.01)
  *H04B 5/00*     (2006.01)
  *H02J 50/10*     (2016.01)

(52) U.S. Cl.
  CPC ............ *H02J 50/90* (2016.02); *H04B 5/0037* (2013.01); *H04B 5/0075* (2013.01); *H04B 5/0087* (2013.01)

(56) References Cited

U.S. PATENT DOCUMENTS

| | | | |
|---|---|---|---|
| 8,269,375 | B2 | 9/2012 | Sogabe |
| 8,699,949 | B2 | 4/2014 | Thevenon |
| 8,870,370 | B1 | 10/2014 | Otis |
| 8,952,572 | B2 | 2/2015 | De Boodt |
| 9,099,239 | B2 | 8/2015 | Abe |
| 9,160,417 | B2 | 10/2015 | Kim |
| 9,177,716 | B2 | 11/2015 | Goto |
| 9,191,075 | B2 | 11/2015 | Jung |
| 9,407,332 | B2 | 8/2016 | Norconk |
| 9,588,163 | B2 | 3/2017 | Yoon |
| 9,728,982 | B2 | 8/2017 | Yamamoto |
| 9,825,486 | B2 | 11/2017 | Liu |
| 9,866,073 | B2* | 1/2018 | Joye ........................ H02J 50/12 |
| 10,135,261 | B2* | 11/2018 | Takahashi ............... H02J 5/005 |
| 10,734,843 | B2* | 8/2020 | Joye ........................ H02J 50/80 |
| 2005/0189882 | A1 | 9/2005 | Baarman |
| 2009/0140691 | A1 | 6/2009 | Jung |
| 2011/0140538 | A1 | 6/2011 | Jung |
| 2011/0215756 | A1 | 9/2011 | Shimizu |
| 2011/0248572 | A1 | 10/2011 | Kozakai |
| 2012/0146580 | A1* | 6/2012 | Kitamura ................ H02J 50/80 320/108 |
| 2012/0235636 | A1* | 9/2012 | Partovi ................ B60L 53/122 320/108 |
| 2012/0293011 | A1 | 11/2012 | Byun |
| 2013/0127410 | A1 | 5/2013 | Park |
| 2013/0200844 | A1* | 8/2013 | Lee ........................ H02J 7/025 320/108 |
| 2014/0191568 | A1 | 7/2014 | Partovi |
| 2014/0217967 | A1* | 8/2014 | Zeine ...................... H02J 50/27 320/108 |
| 2014/0266019 | A1* | 9/2014 | Pigott .................... H02J 50/90 320/108 |
| 2014/0266109 | A1 | 9/2014 | Pigott |
| 2014/0339907 | A1* | 11/2014 | Omae ...................... H02J 50/90 307/104 |
| 2014/0339914 | A1 | 11/2014 | Pooley |
| 2014/0361739 | A1* | 12/2014 | Kwak ................... H04B 5/0087 320/108 |
| 2015/0004907 | A1 | 1/2015 | Subramoniam |
| 2015/0091510 | A1* | 4/2015 | Iwawaki ............... H04B 5/0037 320/108 |
| 2015/0108850 | A1 | 4/2015 | Cho |
| 2015/0163735 | A1 | 6/2015 | Fischer |
| 2015/0180268 | A1 | 6/2015 | Byun et al. |
| 2015/0214745 | A1* | 7/2015 | Yoon ....................... H02J 50/90 307/104 |
| 2015/0249339 | A1* | 9/2015 | Van Wageningen ......................... H04B 5/0093 307/104 |
| 2015/0280444 | A1 | 10/2015 | Smith |
| 2015/0285926 | A1 | 10/2015 | Oettinger |
| 2015/0295450 | A1 | 10/2015 | Bae |
| 2015/0302983 | A1 | 10/2015 | Park |
| 2016/0013658 | A1 | 1/2016 | Kohara |
| 2016/0164345 | A1 | 6/2016 | Sankar |
| 2016/0190872 | A1* | 6/2016 | Bohn ...................... H02J 50/40 307/104 |
| 2016/0043562 | A1 | 11/2016 | Lisi |
| 2016/0341955 | A1 | 11/2016 | McVittie |

FOREIGN PATENT DOCUMENTS

| | | |
|---|---|---|
| EP | 2568572 A1 | 3/2013 |
| EP | 2688219 A1 | 1/2014 |
| EP | 2713475 A2 | 4/2014 |
| JP | 2009130416 A | 6/2009 |
| WO | 2014010951 A1 | 1/2014 |
| WO | 2014020464 A2 | 2/2014 |
| WO | 2014025168 A1 | 2/2014 |
| WO | WO-2014020464 A2 * | 2/2014 ............... H02J 5/005 |

OTHER PUBLICATIONS

"Cordless Kitchen Appliances—A Powerful New Kitchen Concept," White Paper, Wireless Ower Consortium, Apr. 2013, 8 pages.

* cited by examiner

WIRELESS INDUCTIVE POWER TRANSFER

CROSS-REFERENCE TO PRIOR APPLICATION

This application is a continuation of Ser. No. 15/849,873 filed Dec. 21, 2017 which is a continuation of Ser. No. 15/306,575, filed Oct. 26, 2016, which is U.S. National Phase application under 35 U.S.C. § 371 of International Application No. PCT/EP2015/063254, filed on Jun. 15, 2015, which claims the benefit of European Patent Application No. 14173120.8, filed on Jun. 19, 2014. These applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in an off-mode but will monitor its interface surface in order to detect a possible presence of an object. Similarly, the receiver will wait for the presence of a power signal.

Ping Phase:

If the transmitter detects the possible presence of an object, e.g. due to presence of an object that influences the magnetic field on its interface surface, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

The interactions between the different phases are illustrated in FIG. 1.

Qi originally defined a wireless power transfer for low power devices considered to be devices that have a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

Specifically, the Wireless Power Consortium has recently established a Work Group to develop specifications for cordless kitchen appliances. The new specifications will define the interface between kitchen appliances and inductive power sources. Power requirements may vary from the 100 W range (e.g. simple juicers) to 1.5-2.4 kW (typically for heating appliances such as kettles).

The development of the Qi standard to cover an increasing variety of devices and applications also results in a number of new usage scenarios that may not be optimally supported by the existing Qi approach.

For example, in the current Qi standard, when a wireless powered device is placed on top of a power transmitter, the power receiver is (almost) instantaneously (following a quick transition via the identification and configuration phase) powered by the power transmitter. This is suitable for e.g. a charging function where the battery to be charged normally requires immediate charging. However, in many potential new applications, such as e.g. for kitchen appliances, different situations may occur.

For example, when a device, such as a kitchen appliance, is placed on top of a power transmitter, it does not necessarily need to be powered instantaneously. The appliance may not be intended for immediate use and it may be desired that it remains in a switched-off state for a long period of time before being used. For example, a blender arranged for wireless power transfer may be placed on a power transmitter area of a kitchen table top. However, this may simply be for convenience and the blender may not be required to operate until some time later.

It is desired that when the appliance is in the switched-off state, no wireless power signal is provided by the power transmitter. The presence of a potentially strong wireless power signal could potentially result in waste of power and a potential heating of unintended objects in the vicinity (eddy currents may be induced in conductive parts of other proximal objects (such as metal keys) or indeed in e.g. metal parts of the appliance itself. This could e.g. result in significant heating of these objects and elements.

At the same time, it is desired that when power is required due to the appliance being switched on, the power is provided very quickly and preferably is perceived to be provided substantially instantaneously by the user. Such functionality is not supported by the current Qi approach.

Also, the increased variety in applications and devices supported tends to make functions and approaches for the power transmitter detecting and adapting to the specific current scenario more difficult and more critical. Accordingly, improved detection of the current operating environment and scenario would be beneficial.

An improved power transfer system would accordingly be advantageous. In particular, an approach that allows improved operation, improved power transfer, increased flexibility, facilitated implementation, facilitated operation, facilitated detection of and/or adaptation to current conditions, improved support for an increased variety of use scenarios, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an wireless power transfer system including a power transmitter arranged to provide a power transfer to a power receiver via a wireless inductive power transfer signal generated by the power transmitter, wherein: the power receiver comprises a first mode controller for transmitting a standby mode exit request to the power transmitter by changing a loading of a communication inductor of the power transmitter; and the power transmitter comprises: the communication inductor for communicating with the power receiver; a second mode controller for controlling the power transmitter to operate in a standby mode wherein a presence of the power receiver is detected but no power transfer signal is generated; a detector for detecting an impedance change of the communication inductor; and the second mode controller is arranged to initiate a transition from the standby mode to a power transfer mode in response to the detector detecting the impedance change.

The invention may provide improved performance and/or operation of a wireless power transfer system. In many embodiments, the approach may provide improved support for an enhanced range of scenarios, functions and/or applications.

For example, the approach may provide improved support for applications, such as kitchen applications, where power receivers may be inductively coupled to power transmitters without requiring a(n immediate) power transfer. In particular, it provides support by introducing a standby phase which is different from conventional phases where no power receiver is present. Thus, the standby phase can support devices that are positioned on or proximal to the power transmitter but which are not powered. Furthermore, the approach allows for a low complexity and typically reliable approach of the power receiver controlling when power is provided. The complexity increase for both power transmitter and power receiver in order to support such a standby phase can be maintained very low in many embodiments. The approach may further allow a very quick response when the power receiver requires power.

The approach may in many embodiments allow wirelessly powered devices, such as kitchen appliances, to be positioned on a power transmitter without this resulting in power loss or potential undesirable induction in metallic parts resulting from the presence of a power transfer signal.

Further, the approach may allow a very quick response when powering up the device, and indeed with the powering up being controlled by the power receiver. Indeed, the operation and the initiation of a transition into a power transfer phase is not (only) based on a detection of whether a power receiver is present or not but rather the initiation is specifically in response to an explicit request received from the power receiver. Thus, the power receiver can actively control when the power transfer phase is entered.

The system may operate in a standby mode where the power receiver is positioned such that power transfer is feasible but no power transfer is performed. In the standby mode, the power transmitter has detected the presence of the power receiver but no power transfer is taking place, i.e. the power transmitter is not in the power transfer phase (wherein e.g. power control is performed). In the standby mode, the power transmitter may monitor for the transmission of the standby mode exit request from the power receiver. The power transmitter may in many embodiments only monitor for the standby mode exit request when in the standby mode.

In the power transfer mode, the power transmitter may, in contrast to the standby phase, generate the power transfer signal. When in the power transfer mode, the power transfer signal may provide power to the power receiver, i.e. the power receiver may be actively powered by the power transmitter. A power control feedback loop may be supported in the power transfer mode (but not e.g. in the standby mode).

The power receiver is arranged to change a loading of the communication inductor of the power transmitter. The change of the loading causes an impedance change in the (effective) impedance of the communication inductor. The power receiver may specifically provide a load inductively coupled to the communication inductor, and a change in this load may cause an impedance change of the communication inductor. For example, the power receiver may comprise an inductor which is inductively coupled to the communication inductor of the power transmitter. The loading of the communication inductor of the power transmitter may be achieved by changing a characteristic of the inductor of the power receiver or by changing an electrical load coupled to this. The electrical load may for example be a capacitance coupled to the inductor and by changing this capacitor, the loading of the communication inductor of the power transmitter will change. The change in loading results in an impedance change of the communication inductor of the power transmitter.

The power receiver may comprise a receiver circuit coupled to the communication inductor of the power transmitter and may be arranged to transmit the standby mode exit request by changing an electrical characteristic of the receive circuit.

For example, the power receiver may contain a receiver communication inductor which is coupled to the of the communication inductor of the power transmitter. The power receiver may be arranged to change the loading of the communication inductor of the power transmitter by changing an impedance coupled to the receiver communication inductor. For example, the receiver communication inductor may be part of a resonance circuit (similar to a resonance circuit comprising the transmitter communication inductor) and a capacitance of the resonance circuit may be changed to change the loading of the receive communication inductor and thus the transmitter communication inductor.

The impedance change of the communication inductor of the power transmitter may be detected indirectly or directly. Specifically, the impedance change may be detected for example by detecting a change in a voltage, current, phase and/or resonance frequency. In many embodiments, the impedance change may be detected by detecting a change in voltage and/or current of the communication inductor of the power transmitter.

In many embodiments, the communication inductor of the power transmitter may be part of a resonance circuit. The impedance change of the communication inductor may be detected by detecting a change in a characteristic of the resonance circuit. Specifically, the impedance change of the communication inductor may cause the resonance frequency of the resonance circuit to change and the detector may detect the impedance change by detecting the resonance frequency change. The impedance change may for example be detected by a change in a voltage, current level and/or phase for the resonance circuit and/or communication inductor.

The power receiver is thus arranged to transmit a standby mode exit request by actively changing an electrical characteristic of the power receiver, and specifically of a receive circuit inductively coupled to the communication inductor of the power transmitter. The power receiver is accordingly actively in control of when the power transfer is initiated and this does not merely happen as an automatic consequence of the power receiver being present. Furthermore, the power transmitter enters a dedicated standby mode wherein it can explicitly monitor for the standby mode exit request thereby allowing the power transfer to be initiated quickly and reliably, and often such that the switching on of the power device is perceived to be substantially instantaneous.

The power receiver may comprise a mode controller for operating the power receiver in a standby mode wherein no power transfer signal is received, and a power-on detector for detecting a power-on condition for the power receiver. A transition controller of the power receiver may be arranged to transmit a standby mode exit request to the power transmitter by changing a loading of a communication inductor of the power transmitter in response to the detector detecting the power-on condition.

The transition from the standby mode to the power transfer mode need not be a direct transition but may e.g. include intervening modes or phases, such as for example an identification and configuration phase. Also, the transition may be a conditional transition and specifically the system may be arranged to potentially terminate the transition into the power transfer phase in some scenarios. For example, one or more tests may be performed during the transition and the transition may be terminated if these are not met.

In some embodiments, the communication inductor may be a communication coil, and specifically may be a low power communication coil. In some embodiments, the communication inductor may be a power transfer inductor which is used to generate the power transfer signal.

The transmitter communication inductor 209 may be a dedicated communication inductor or may be an inductor also used for other purposes, such as specifically for generating the power transfer signal. The transmitter communication inductor may specifically also be a transmitter power transfer inductor.

In accordance with an optional feature of the invention, the power receiver is arranged to transmit the standby mode exit request in response to receiving a power-on user input.

The invention may provide an improved user experience in many scenarios, and may for example allow a user to control the operation of a wirelessly powered device while allowing the device to be positioned on a power transmitter.

The power-on user input may specifically be an activation of an on switch. The power receiver may be arranged to transmit the standby mode exit request by changing the loading of a communication inductor in response to receiving a user activation, such as specifically an input from an activation of an on switch.

In accordance with an optional feature of the invention, the communication inductor is separate from a transmitter power coil generating the power transfer signal.

The power inductor may specifically be a low power coil which is used for communication. For example, during the power transfer phase, the power transmitter may generate a communication carrier which may be modulated by the power transmitter (e.g. amplitude, frequency and/or phase modulated) or may be load modulated by the power receiver.

The use of a separate communication inductor allows an efficient separation of the requirements and properties for the power transfer and the requirements and properties for the communication. Further, the use of the communication inductor also for detection and transmission of the standby mode exit request provides a more efficient and reliable system. For example, the required load change can typically be reduced substantially compared to that required if the power inductor is used.

In accordance with an optional feature of the invention, the power receiver is arranged to generate the standby mode exit request to comprise control data, and the power transmitter comprises a receiver for retrieving the control data and the second mode controller is arranged to adapt the transition from the standby mode to the power transfer mode based on the control data.

This may e.g. provide improved functionality and/or an enhanced user experience in many scenarios. The control data may for example include an indication of an initial power level for the power transfer signal.

In accordance with an aspect of the invention, there is provided a power transmitter for a wireless power transfer system including a power receiver arranged to receive power from the power transmitter via a wireless inductive power transfer signal generated by the power transmitter, and to transmit a standby mode exit request by changing a loading of a communication inductor; the power transmitter comprising: the communication inductor for communicating with the power receiver; a mode controller for controlling the power transmitter to operate in a standby mode wherein a presence of the power receiver is detected but no power transfer signal is generated; a detector for detecting an impedance change of the communication inductor; and wherein the mode controller is arranged to initiate a transition from the standby mode to a power transfer mode in response to the detector detecting the impedance change.

In accordance with an optional feature of the invention, the communication inductor is part of a resonance circuit having a resonance frequency; and the detector is arranged to detect the impedance change based on an estimate of the resonance frequency, the detector further being arranged to determine the estimate of the resonance frequency in the stand-by phase.

The impedance change may be detected in response to a change of the resonance frequency of the resonance circuit. The resonance circuit may have a first resonance frequency during an off (or selection) phase wherein no power receiver is present, a second resonance frequency during the standby phase when the power receiver is present but no standby mode exit request is communicated, and a third resonance frequency during the standby phase when a standby mode exit request is transmitted. The resonance frequencies will typically be sufficiently different for the change in the loading of the communication inductor to be detected by the detection of the change in resonance frequency.

The detector may specifically be arranged to estimate the second resonance frequency, i.e. the resonance frequency in the standby phase. This frequency may depend on a number of parameters including the properties of the device comprising the power receiver, the exact position of the device etc. The detector may be arranged to dynamically estimate the resonance frequency in the standby phase and to adapt the operation accordingly.

The resonance circuit may specifically be formed by a number of capacitors and a number of inductors of which the communication inductor is one. In some scenarios, the resonance circuit may e.g. also comprise one or more resistive elements. In some embodiments, the resonance circuit may be formed by the communication inductor and a capacitor. In some embodiments, the resonance circuit may be a parallel resonance circuit. In other embodiments, the resonance circuit may be a series resonance circuit.

In accordance with an optional feature of the invention, the communication inductor is part of a resonance circuit and the detector is arranged to apply an excitation signal to the resonance circuit and to detect the impedance change from a measurement of at least one of a communication inductor voltage and a communication inductor current.

This may provide a particularly advantageous operation in many embodiments. In particular, it may typically allow more accurate detection. The approach may in many embodiments allow the power receiver to transmit the standby mode exit request without requiring any power to be provided by the power transmitter. Indeed, in many embodiments, a purely manual change of the loading can be achieved.

The measurement of the communication inductor voltage and a communication inductor current may be an amplitude measurement. The measurement of the communication inductor voltage and a communication inductor current may be a measurement at a single instant, or may e.g. be an average value, an average RMS value, etc. in a time interval.

The excitation signal may comprise one or more excitations. Each excitation may e.g. be a voltage or current pulse, impulse, transition, or e.g. step change. An excitation will cause oscillations to occur in the resonance circuit.

In accordance with an optional feature of the invention, the excitation signal comprises repeated excitations having a time offset resulting in interference between oscillations of the resonance circuit for two consecutive excitations.

This may allow a substantially more accurate and/or facilitated detection of the impedance change.

Each excitation will cause oscillations in the resonance circuit. The excitation signal is generated to have excitations that are spaced apart (in time) such that interference will occur between oscillations of consecutive excitations. The duration between (at least) two consecutive excitations is less than a time it takes for oscillations to expire. In many embodiments, an excitation will occur no later than when an amplitude of the oscillations induced by the previous excitation is no less than 10%, 20%, or even 50% of the maximum amplitude of the induced oscillations. The amplitude may specifically be an amplitude of at least one of the communication coil voltage and current.

In many embodiments, the excitations are timed such that the resulting oscillations from (at least some) consecutive excitations are overlapping.

In many embodiments, the excitation signal may be generated to have a time offset between excitations of no more than $Q \cdot T_{res}$ where Q is the quality factor for the resonance circuit and $T_{res}$ is the time period of the resonance of the resonance circuit.

In accordance with an optional feature of the invention, the detector is arranged to adapt a repetition interval for the repeated excitations based on an amplitude of at least one of a communication inductor voltage and a communication inductor current.

The timing of the excitations may be modified based on the amplitude. The approach may allow the timing between excitations to be controlled such that the interference between the oscillations of different excitations interact to provide an increased difference as a function of load changes.

The amplitude may be determined with a time offset relative to a timing of the excitations.

The approach may allow a substantially more accurate detection of the standby mode exit request.

In accordance with an optional feature of the invention, the detector is arranged to adapt the repetition interval to maximize the at least one of the communication inductor voltage and the communication inductor current.

This may allow a substantially more accurate detection of the standby mode exit request.

The maximization may specifically be performed when no standby mode exit request is being transmitted.

In accordance with an optional feature of the invention, the power transmitter is arranged to measure the at least one of the communication inductor voltage and the communication inductor current with a time offset relative to a time of a nearest previous excitation.

This may allow improved detection of the standby mode exit request.

In particular, if the load change detection is based on excitations that occur such that oscillations of different excitations do not interfere, the approach allows the measurement to provide a substantially increased difference for load changes.

In accordance with an optional feature of the invention, the time offset is no less than 10 and no more than 60 time periods for a resonance of the resonance circuit.

This may allow improved detection of the standby mode exit request.

In accordance with an optional feature of the invention, the communication inductor is part of a resonance circuit and the detector is arranged to apply an excitation signal to the resonance circuit, and to adjust a repetition frequency for excitations of the excitation signal in response to a resonance frequency estimate for a resonance frequency of the resonance circuit when in the standby mode.

This may allow improved performance, and specifically may result in improved detection of the standby mode exit request in many embodiments. The resonance frequency estimate may e.g. be generated based on a frequency sweep of a signal applied to the resonance circuit.

In accordance with an aspect of the invention, there is provided a power receiver for a wireless power transfer system including a power transmitter arranged to provide a power transfer to the power receiver via a wireless inductive power transfer signal generated by the power transmitter, the power receiver comprising: a mode controller for operating the power receiver in a standby mode wherein no power transfer signal is received; a power-on detector for detecting a power-on condition for the power receiver; and a transition controller arranged to transmit a standby mode exit request to the power transmitter by changing a loading of a communication inductor of the power transmitter in response to the power-on detector detecting the power-on condition.

According to an aspect of the invention there is provided a method of operation for a wireless power transfer system including a power transmitter arranged to provide a power transfer to a power receiver via a wireless inductive power transfer signal generated by the power transmitter, the method comprising: the power transmitter operating in a standby mode wherein a presence of the power receiver is detected but no power transfer signal is generated; the power receiver transmitting a standby mode exit request to the power transmitter by changing a loading of a communication inductor of the power transmitter; the power transmitter detecting an impedance change of the communication inductor; and the power transmitter 201 initiating a transition from the standby mode to a power transfer mode in response to the detection of the impedance change.

According to an aspect of the invention there is provided a method of operation for a power transmitter for a wireless power transfer system including a power receiver arranged to receive power from the power transmitter via a wireless inductive power transfer signal generated by the power transmitter, and to transmit a standby mode exit request by changing a loading of a communication inductor; the method comprising: controlling the power transmitter to operate in a standby mode wherein a presence of the power receiver is detected but no power transfer signal is generated; detecting an impedance change of the communication inductor; and initiating a transition from the standby mode to a power transfer mode in response to the detection of the impedance change.

According to an aspect of the invention there is provided a method of operation for a power receiver for a wireless power transfer system including a power transmitter arranged to provide a power transfer to the power receiver via a wireless inductive power transfer signal generated by the power transmitter, the method comprising: operating the power receiver in a standby mode wherein no power transfer signal is received; detecting a power-on condition for the power receiver; and transmitting a standby mode exit request to the power transmitter by changing a loading of a communication inductor of the power transmitter in response to the detection of the power-on condition.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as is known from the Qi specification. However, it will be appreciated that the invention is not limited to this application but may be applied to many other wireless power transfer systems.

Figure 1:
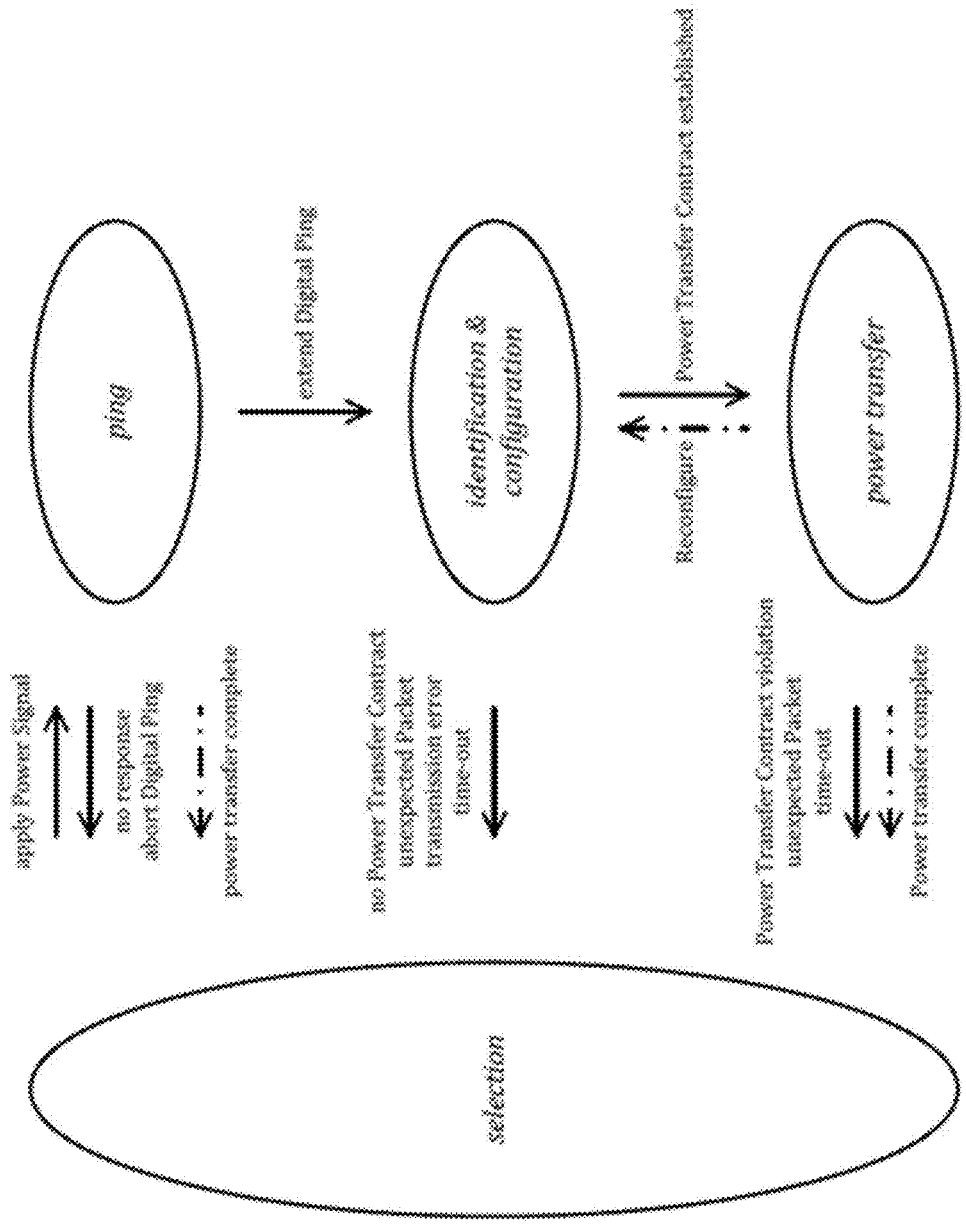
FIG. 1 illustrates an example of operational phases of power transfer system in accordance with prior art.
Figure 2:
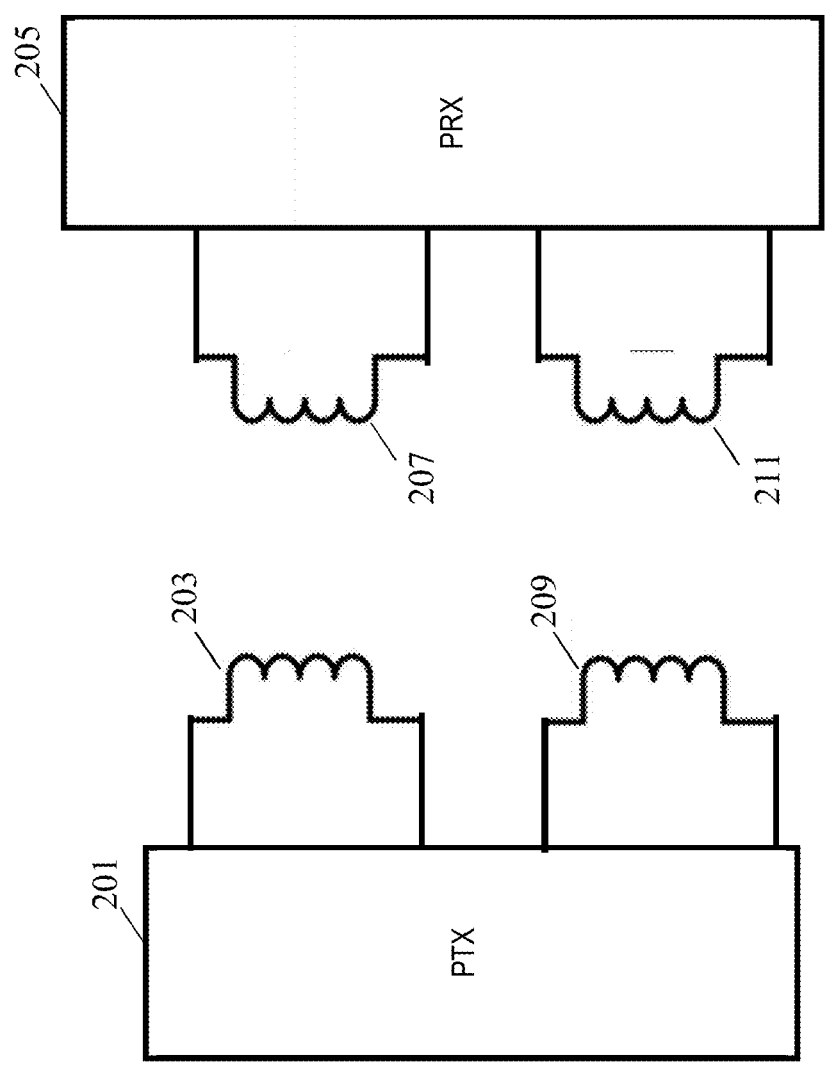
FIG. 2 illustrates an example of elements of a power transfer system in accordance with some embodiments of the invention.

FIG. 2 illustrates an example of a power transfer system in accordance with some embodiments of the invention. The power transfer system comprises a power transmitter 201 which includes (or is coupled to) a transmitter power coil/inductor 203. The system further comprises a power receiver 205 which includes (or is coupled to) a receiver power coil/inductor 207.

The system provides a wireless inductive power transfer from the power transmitter 201 to the power receiver 205. Specifically, the power transmitter 201 generates a wireless power transfer signal (also for brevity referred to as a power signal or an inductive power signal), which is propagated as a magnetic flux by the transmitter power coil 203. The power transfer signal may typically have a frequency between around 20 kHz to 200 kHz, and often close to around 100 kHz. The transmitter power coil 203 and the receiver power coils 207 are loosely coupled and thus the receiver power coil 207 picks up (at least part of) the power signal from the power transmitter 201. Thus, the power is transferred from the power transmitter 201 to the power receiver 205 via a wireless inductive coupling from the transmitter coil 203 to the receiver coil 207. The term power transfer signal is mainly used to refer to the inductive signal/magnetic field between the transmitter coil 203 and the receiver coil 207 (the magnetic flux signal), but it will be appreciated that by equivalence it may also be considered and used as a reference to an electrical signal provided to the transmitter coil 203 or picked up by the receiver coil 207.

In the following, the operation of the power transmitter 201 and the power receiver 205 will be described with specific reference to an embodiment in accordance with the Qi standard (except for the herein described (or consequential) modifications and enhancements). In particular, the power transmitter 201 and the power receiver 205 may substantially be compatible with the Qi Specification version 1.0 or 1.1 (except for the herein described (or consequential) modifications and enhancements).

As previously described, in order to control the power transfer, the system may proceed via different phases, in particular a selection phase, a ping phase, identification and configuration phase, and a power transfer phase. More information can be found in chapter 5 of part 1 of the Qi wireless power specification.

For example, when setting up communication with the power receiver 205, the power transmitter 201 may initially be in the selection phase wherein it merely monitors for the potential presence of a power receiver. The power transmitter 201 may use a variety of methods for this purpose, e.g. as described in the Qi wireless power specification. One option is to perform what is referred to as an analog ping.

Annex B-1 of the "Qi system description, wireless power transfer, volume I: low power, part 1: interface definition", Version 1.1.2, June 2013 describes the analog ping method based on a shift of the resonance frequency of a series resonance circuit (including the power inductor) of the output power circuit of the power transmitter due to the presence of an object that influences the magnetic field on top of the power transmitter. In this method, the power transmitter applies a signal to its power inductor. This results in a power inductor current. The measured value depends on whether or not an object is placed on top of the power transmitter.

The measured value is at a maximum when the resonance frequency has not changed as a consequence of an object being present. The object can be a power receiver or a foreign object. Thus, if the measured current is under a certain threshold, the power transmitter can conclude that an object is present. The power transmitter applies the pulses at regular intervals. This interval is much larger than the duration of the pulse (specifically in Annex B-1, an interval of 500 ms and a pulse duration of at most 70 μs are described). The power inductor current should be measured at most a few μs after the pulse (i.e. after 19.5 μs).

If such a potential presence is detected, the power transmitter 201 enters the ping phase wherein a power signal is temporarily generated. The first power receiver 205 can apply the received signal to power up its electronics. After receiving the power signal, the power receiver 205 communicates an initial packet to the power transmitter 201. Specifically, a signal strength packet indicating the degree of coupling between the power transmitter 201 and the first power receiver 205 is transmitted. More information can be found in chapter 6.3.1 of part 1 of the Qi wireless power specification. This operation is also referred to as a digital ping. Thus, in the ping phase, the power transmitter executes a digital ping, and listens for a response. If the power transmitter detects a power receiver, the power transmitter may extend the digital ping. This leads the system to proceed to the identification & configuration phase.

In this phase, the power receiver 205 keeps the output load disconnected and communicates to the power transmitter 201 using load modulation. The power transmitter provides a power signal of constant amplitude, frequency and phase for this purpose (with the exception of the change caused by load-modulation). The messages are used by the power transmitter 201 to configure itself as requested by the power receiver 205. Thus, in the identification & configuration phase, the power transmitter identifies the power receiver and receives configuration information from the power receiver.

Following the Identification and Configuration phase, the system moves on to the power transfer phase where the actual power transfer takes place. Specifically, after having communicated its power requirement, the power receiver 205 connects the output load and supplies it with the received power. The power receiver 205 monitors the output load and measures the control error between the actual value and the desired value of a certain operating point. It communicates such control errors to the power transmitter 201 at a minimum rate of e.g. every 250 ms to indicate these errors to the power transmitter 201 as well as the desire for a change, or no change, of the power signal.

Thus, in the power transfer phase, the power transmitter provides power to the receiver, adjusting the power it transmits in response to the control data that it receives from the power receiver.

In order to prepare and control the power transfer between the power transmitter 201 and the power receiver 205, 207 in the wireless power transfer system, the power receiver 205 communicates information to the power transmitter 201. Such communication has been standardized in the Qi Specification version 1.0 and 1.1.

On the physical level, the communication channel from the power receiver 205 to the power transmitter 201 is in Qi Specification version 1.0 and 1.1 implemented using the wireless inductive power signal as a carrier. The power receiver 205 transmits data messages by modulating the load of the receiver power coil 207. This results in corresponding variations in the power signal at the power transmitter side. The load modulation may be detected by a change in the amplitude and/or phase of the transmitter power inductor current, or alternatively or additionally by a change in the voltage of the transmitter power inductor 203. Based on this principle, the power receiver 205 can modulate data which the power transmitter 201 can then demodulate. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The system of FIG. 2 comprises some differences with respect to a conventional Qi version 1 or 1.1 system.

Firstly, the communication is not (fully) performed using the power transfer signal. Rather, in the system of FIG. 2, a separate communication link is formed between the power receiver 205 and the power transmitter 201. In many embodiments, the separate communication link may be arranged to support bidirectional communication, i.e. both communication in the forward (from power transmitter to power receiver) and reverse (power receiver to power transmitter) directions.

In the example, separate communication link is supported by additional communication inductors at the power transmitter 201 and power receiver 205. Thus, the power transmitter 201 comprises a transmitter communication inductor 209 and the power receiver 205 comprises a receiver communication inductor 211. The transmitter communication inductor 209 and receiver communication inductor 211 are loosely coupled. During the power transfer phase, the power transmitter 201 is in the example arranged to generate a communication carrier signal and apply this to the transmitter communication inductor 209. The generated communication signal accordingly induces a current in the receiver communication inductor 211.

Communication from the power transmitter 201 to the power receiver 205 may be performed by directly modulating the carrier signal, e.g. by amplitude, frequency and/or phase modulation. The power receiver 205 can demodulate the carrier to retrieve the data. Communication from the power receiver 205 to the power transmitter 201 may be performed e.g. by load modulating the carrier signal.

The use of a separate communication link using separate communication inductors allow for a more accurate and reliable communication in many scenarios. In particular, it allows the individual optimization of the communication characteristics independently of the power provision. For example, the frequency of the communication carrier signal can be chosen to be significantly higher than the frequency of the power transfer signal. This separation is particularly advantageous for higher power applications and thus for the further developments of the Qi system. As the power levels increase, the requirements for the properties of the driver circuits, the transmitter power inductor 203 etc. makes them less suitable for communication (e.g. the amount of load modulation required for reliable detection increases as the power levels increase).

Secondly, in the system of FIG. 2, the described phases are supplemented by an additional standby phase. In the standby phase, the power receiver 205 has been detected by the power transmitter 201 but power is not provided to the power receiver 205. Thus, in the standby phase, the power transmitter 201 is aware that a power receiver 205 has been positioned such that power transfer is possible. However, the power transfer is not started but rather is waiting for the power receiver 205 to specifically request a power transfer.

Thus, in the standby phase, the power transmitter 201 has detected that a power receiver 205 is present and it is accordingly continuously monitoring for transmissions from the power receiver 205 to request that power transfer is initiated.

In the system of FIG. 2, the power transmitter does accordingly not automatically proceed to initialize a power transfer when a power receiver 205 is detected. Rather, it moves to a standby phase wherein no power transfer signal is generated, and thus no power transfer occurs, while monitoring for a standby mode exit request to be received from the power receiver 205. When such a standby mode exit request is received from the power receiver 205, the power transmitter 201 proceeds to initialize a power transfer, e.g. by entering the ping phase and following the Qi power transfer initialization process from then on.

The power receiver 205 and/or power transmitter 201 do not necessarily move directly from e.g. a selection phase to the standby phase but may e.g. proceed to this via intervening phases. As a specific example, when the power receiver 205 is positioned on the power transmitter 201, the power transmitter 201 may first detect this as an object. Typically, it will not yet know if this object is indeed a power receiver. After detecting the placement of an object in the selection phase, the power transmitter 201 will in many embodiments proceed to the ping phase to determine whether the object is a power receiver. After the power receiver 205 in this phase has responded to the ping signal, the power transmitter 201 knows that the object is a power receiver 205. If the power receiver 205 requires no power at this point in time, it can indicate this to the power transmitter 201 by communicating e.g. an end power transfer packet or any other suitable packet, or by omitting to communicate subsequent packets after it has communicated the first packet.

The power transmitter 201 will then move to the standby phase.

The power receiver 205 may generate the standby mode exit request when it detects that the device comprising the power receiver 205 is entering an active state. Specifically, a user may manually press a power-on button on the power receiver 205 and this may cause the power receiver 205 to transmit the standby mode exit request.

The communication of the standby mode exit request is by the power receiver 205 changing a loading of the transmitter communication inductor 209. Typically, this may be done by the power receiver 205 changing a load impedance of an impedance coupled to (across) the receiver communication inductor 211. The change in loading is then detected by the power transmitter 201 detecting a change in the (effective) impedance of the transmitter communication inductor 209. When detecting this change the power transmitter 201 proceeds to initialize the power transfer.

As a particularly advantageous example, the power receiver 205 may be part of a kitchen appliance, such as a blender or a kettle. This appliance may be positioned on the power transmitter 201 but without any intention of the user of immediately using the appliance. Thus, in response to the detection of the appliance, the power transmitter 201 may move into the standby mode of operation.

The user, or e.g. a controller in the appliance, can then trigger an impedance change in the appliance communication circuitry that can be detected by the power transmitter 201. Thus, this impedance change acts as the standby mode exit request, which can be treated as a wake-up signal that causes the power transmitter 201 to start providing power.

Thus, the user, or a controller of the appliance, can trigger an impedance change (e.g. a shift of the resonance frequency) in the appliance communication circuitry that can be detected by the power transmitter 201. The power transmitter detects the standby mode exit request e.g. by measuring an amplitude change in the current flowing through the transmitter communication inductor 209 or an amplitude change in the voltage across it.

Figure 3:
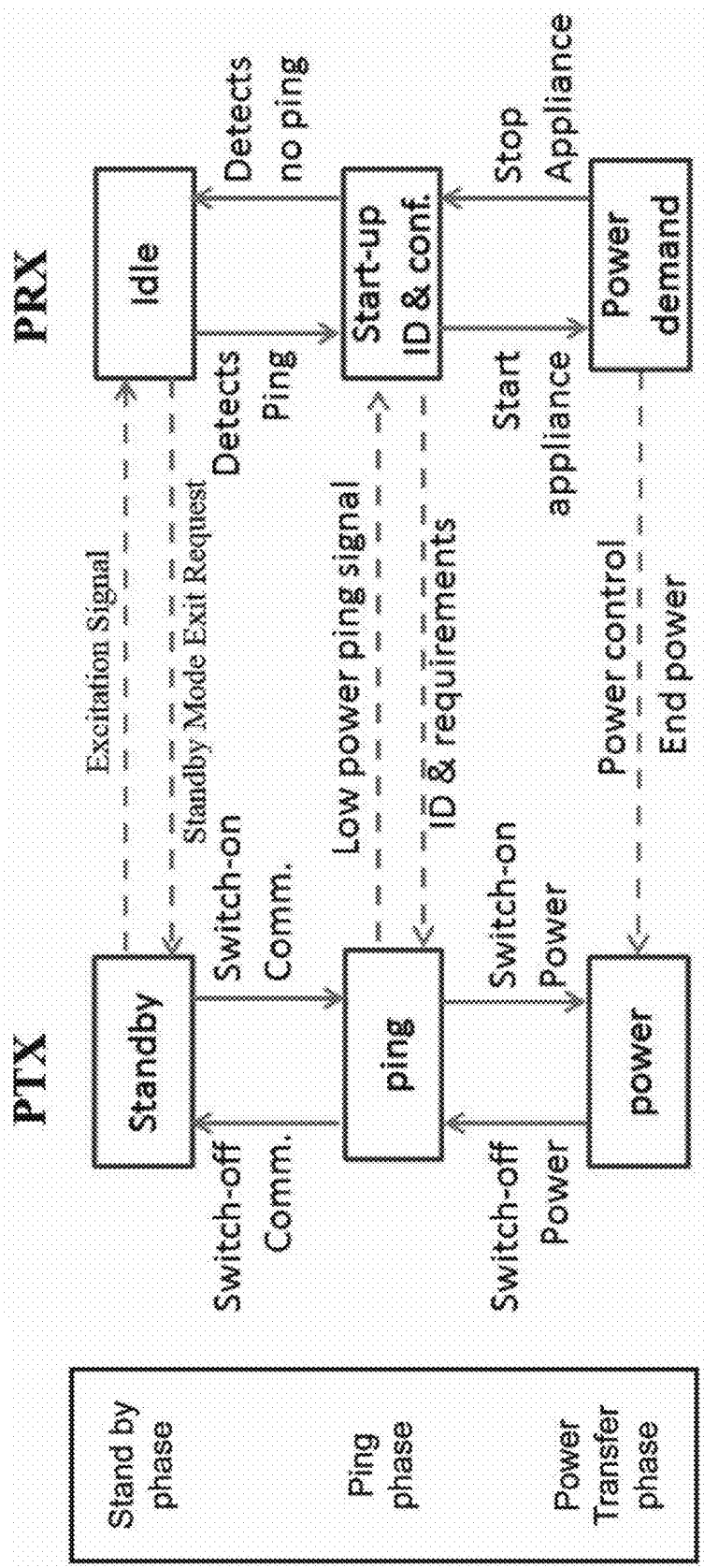
FIG. 3 illustrates an example of operational phases of power transfer system in accordance with some embodiments of the invention.

An example of a suitable operation of the system is illustrated in FIG. 3. The figure illustrates an example wherein the Qi phase approach is modified to include a standby phase. The figure illustrates the transition from the standby phase to the power transfer phase via a ping phase corresponding to the Qi ping phase.

Figure 4:
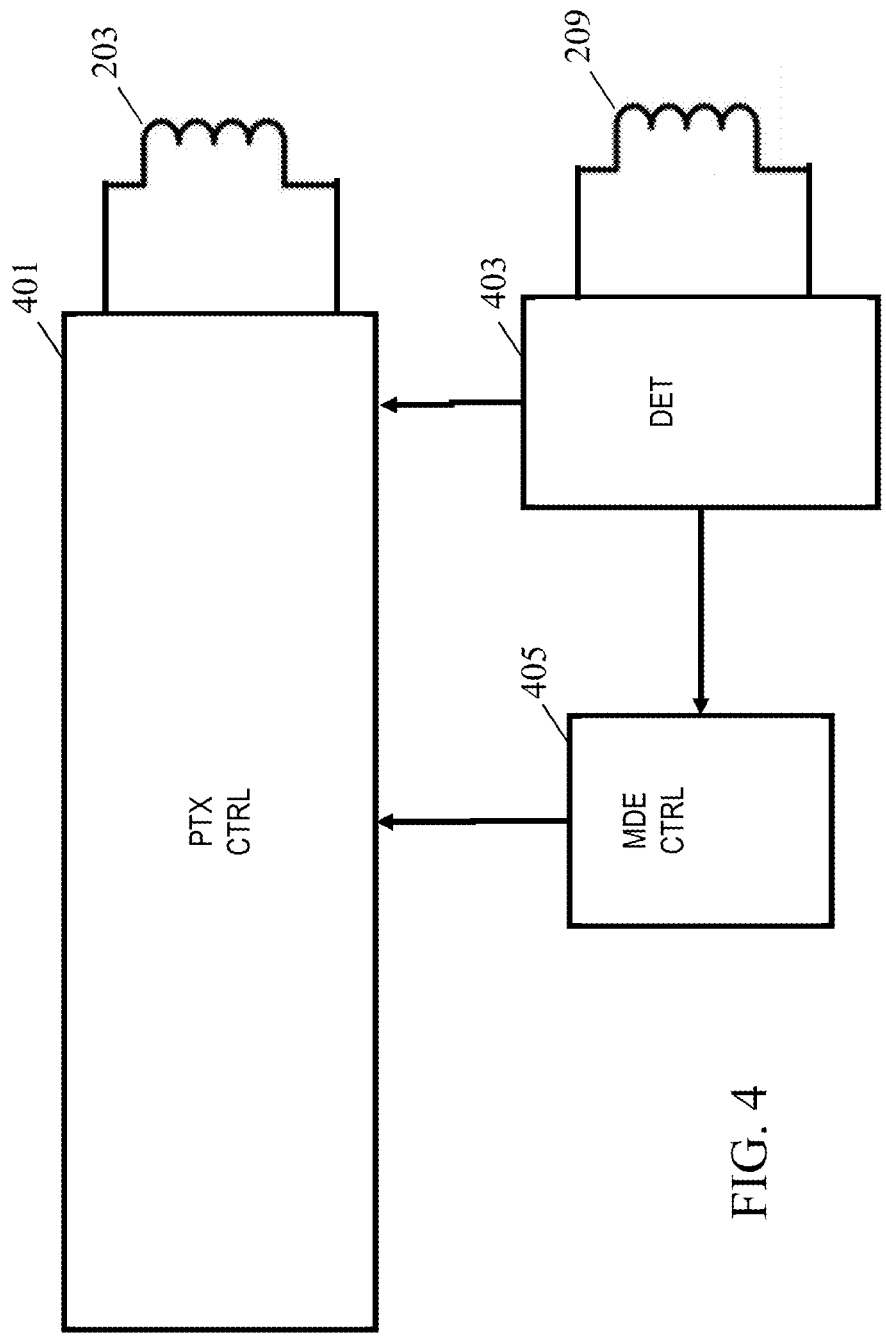
FIG. 4 illustrates an example of elements of a power transmitter in accordance with some embodiments of the invention.

FIG. 4 illustrates some exemplary elements of the power transmitter 201 of FIG. 2.

FIG. 4 illustrates a transmitter power controller 401 which is coupled to the transmit coil 203 and which generates an electrical power signal and provides this to the transmit power coil 203. Thus, the transmitter power controller 401 provides the wireless inductive power transfer signal to the power receiver 205 via the transmit power coil 203 (and the receive power coil 207).

Figure 5:
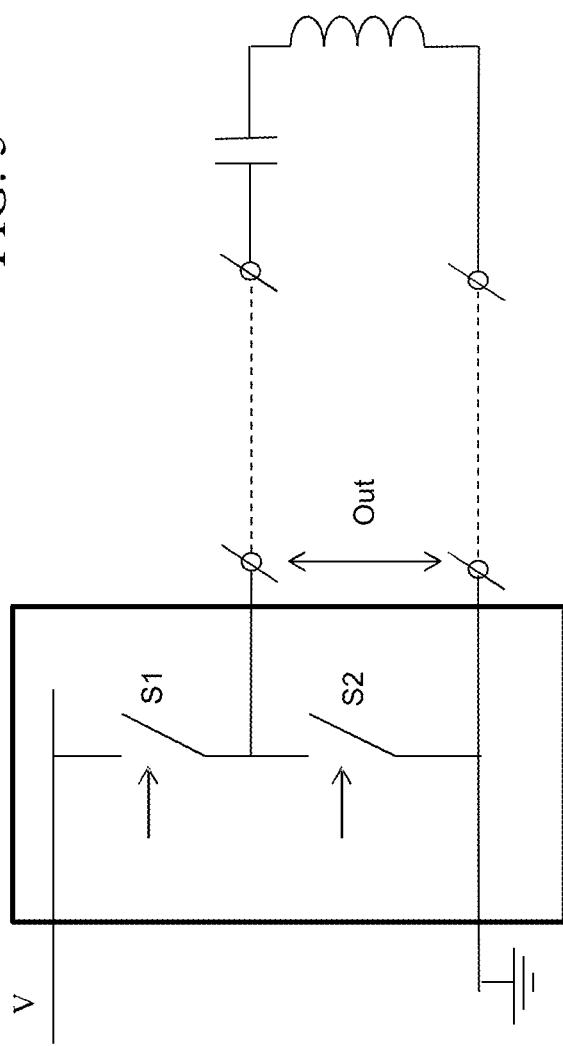
FIG. 5 illustrates an example of elements of a half-bridge inverter for a power transmitter in accordance with some embodiments of the invention.
Figure 6:
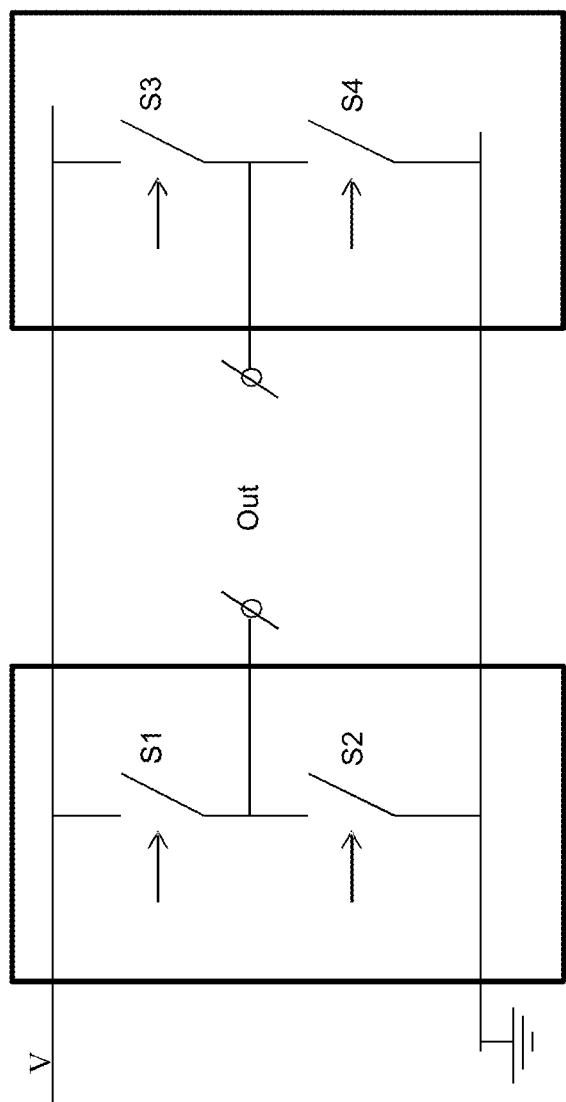
FIG. 6 illustrates an example of elements of a full-bridge inverter for a power transmitter in accordance with some embodiments of the invention.

The transmitter power controller 401 generates the current and voltage which is fed to the transmitter power coil 203. The transmitter power controller 401 typically comprises a drive circuit in the form of an inverter which generates an alternating signal from a DC Voltage. FIG. 5 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 6 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a block-wave signal at the output. The switches are open and closed with the desired frequency.

The transmitter power controller 401 also comprises control functionality for operating the power transmitter 201 and specifically the power transfer function. In the example, the transmitter power controller 401 comprises functionality for operating the power transmitter 201 in accordance with the Qi standard. For example, the transmitter power controller 401 may be arranged to perform the Selection, Ping, Identification and Configuration and power transfer phase of the Qi standard.

In the example, the power transmitter 201 comprises a single transmitter coil 203 which is driven by the transmitter power controller 401. Thus, the wireless inductive power signal is generated by a single transmitter coil 203. However, it will be appreciated that in other embodiments, the power transfer signal may be generated by a plurality of transmitter coils driven e.g. in parallel by the driver. Specifically, multiple transmitter coils driven by corresponding (dependent) output signals of the transmitter power controller 401 may be used to generate the wireless inductive power signal. For example, two transmitter coils may be positioned at different positions to provide two charging points for two power receivers. The two coils may be fed by the same output signal from the transmitter power controller 401. This may allow an improved distribution of the wireless inductive power signal/magnetic field in order to support multiple charging points.

The power transmitter 201 further comprises a detector 403 which is coupled to the transmitter communication inductor 209. The detector 403 may specifically support bidirectional communication between the power receiver 205 and the power transmitter 201 in e.g. the Identification and Configuration and power transfer phases.

In addition, the detector 403 is when the power transmitter 201 is operating in the standby mode arranged to detect an impedance change for the transmitter communication inductor 209. The impedance change may specifically be detected by a change in current through the transmitter communication inductor 209, voltage over the transmitter communication inductor 209 or a resonance frequency of a resonance circuit of which the transmitter communication inductor 209 is part.

Specifically, the transmitter communication inductor 209 may be part of a series resonance circuit which may specifically comprise the transmitter communication inductor 209 and a series resonance capacitor. The resonance frequency or the impedance of the series resonance circuit will be dependent on the loading of the transmitter communication inductor 209 by the power receiver 205 and specifically is dependent on a loading of the receiver communication inductor 211 which is coupled to the transmitter communication inductor 209. The detector 403 may detect these changes by detecting a resonance frequency change, and/or e.g. by detecting a change in the amplitude of a current or voltage of the transmitter communication inductor 209. Specific examples of the operation of the detector 403 will be described later.

The detector 403 is coupled to a transmitter mode control 405 which is also coupled to the transmitter power controller 401. The transmitter mode control 405 is arranged to control the power transmitter 201 to operate in the standby mode wherein the presence of the power receiver is detected but no power transfer signal is generated.

Specifically, when the power transmitter 201 is operating in the selection phase and performs an analog ping that indicates that a power receiver is currently present (or has been placed on the power transmitter 201), the transmitter mode control 405 may be notified. In response, it may control the transmitter power controller 401 to not proceed to the ping phase but instead to enter a standby mode. In this standby mode, no power transfer signal is generated. As a specific example, the transmitter mode control 405 may simply put the power transmitter communicator 501 in a halt or sleep mode wherein the progress from the selection phase to the ping phase is paused until the transmitter mode control 405 indicates that the power transmitter can continue.

In many embodiments, if the power transmitter 201 has detected the presence or occurrence of an object in the selection phase, but is not able to recognize if the detected object is a power receiver or not, it will enter the ping phase from the selection phase. A power receiver will respond to this digital ping indicating its presence. However if the power receiver does not need power, it will indicate so, e.g. by communicating an end power transfer packet, or omitting to communicate succeeding packets after the first packet; the transmitter mode control 405 may be notified. In response, it may control the transmitter power controller 401 to not continue in the ping phase, or proceed to the power transfer phase but instead to enter a standby mode. In this standby mode, no power transfer signal is generated. As a specific example, the transmitter mode control 405 may simply put the power transmitter 201 in a halt or sleep mode wherein the progress in the ping phase is paused, or stopped until the transmitter mode control 405 indicates that the power transmitter can continue or restart the ping phase. Thus, the power transmitter may not enter the standby phase directly from the selection phase but may potentially proceed to this via other phases, such as typically the ping phase.

During the standby phase, the transmitter mode control 405 further waits for any indication from the detector 403 that an impedance change corresponding to a standby mode exit request has been detected. If such an indication is received, the transmitter mode control 405 proceeds to initiate the transition from the standby mode to a power transfer mode. This may for example be achieved simply by the transmitter mode control 405 setting a control signal for the transmitter power controller 401 that it can exit the sleep or halt state, i.e. it may simply set a control signal to indicate that the transmitter power controller 401 can proceed to enter the ping phase and e.g. follow a standard Qi setup of the power transfer.

Figure 7:
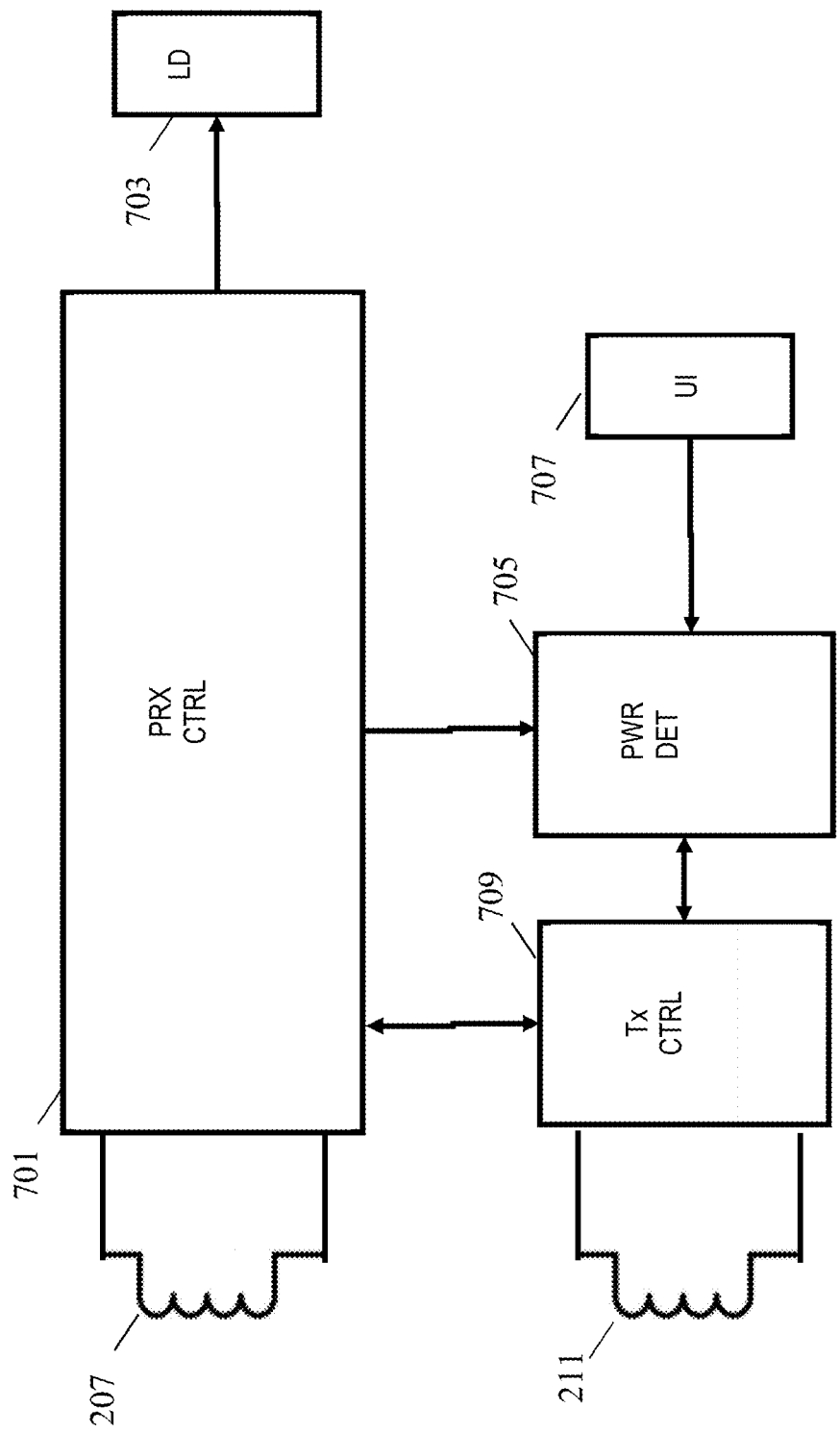
FIG. 7 illustrates an example of elements of a power receiver in accordance with some embodiments of the invention.

FIG. 7 illustrates some exemplary elements of the power receiver 105.

The receiver coil 207 is coupled to a power receiver controller 701, which comprises various functionality for operating the power receiver 105, and is in the specific example arranged to at least partly operate the power receiver 105 in accordance with the Qi Specification. For example, the first power receiver 105 may be arranged to perform the selection, ping, Identification and Configuration and power transfer phases of the Qi Specification.

The power receiver controller 701 is arranged to receive the wireless inductive power signal and to extract the power during the power transfer phase. The power receiver controller 701 is coupled to a power load 703 which is the load powered from the power transmitter 101 during the power transfer phase. The power load 703 may be an external power load but is often part of the power receiver device, such as the motor of a blender, the heating element of a kettle etc.

The power receiver controller 701 is furthermore arranged to operate the power receiver 205 in a standby mode. Specifically, during the standby phase, no power transfer signal is received by the receiver communication inductor 211. In this phase, the power receiver controller 701 may e.g. switch to a sleep state wherein no power is provided to the load 703 and indeed no functionality is performed by the power receiver controller 701 except for monitoring for a wake-up signal. The monitoring may be a passive monitoring and indeed in some signals the power receiver controller 701 may be switched off during the standby phase and the power receiver controller 701 may be arranged to exit the sleep state in response to the power receiver controller 701 being provided with power, e.g. from an internal battery.

The power receiver controller 701 furthermore comprises a power-on detector 705 which is arranged to detect a power-on condition. The power-on condition may be considered to exist when a condition or event satisfies a power-on criterion. The criterion may specifically be a predetermined criterion which reflects a situation in which the device comprising the power receiver is or should be switched on.

In the example of FIG. 7, the power-on detector 705 is arranged to detect the power-on condition in response to receiving a user input requesting a power-on of the device. Thus, in the example, the power receiver is arranged to transmit the standby mode exit request in response to receiving a power-on user input.

Specifically, the power receiver 205 comprises a user interface 707 which specifically may be a simple manual button or switch. The user activation of such a switch may generate a signal which by the power-on detector 705 is considered to be a power-on condition.

The power-on detector 705 is coupled to a transition controller 709 which is further coupled to the receiver communication inductor 211. The transition controller 709 is arranged to transmit the standby mode exit request to the power transmitter 201 in response to the power-on detector 705 detecting the power-on condition. Specifically, the transition controller 709 may in response to receiving an indication of the power-on detector 705 detecting a power-on condition proceed to change the loading of the receiver communication inductor 211, and thus the loading of the transmitter communication inductor 209. Accordingly, this may be detected by the power transmitter 201 which may proceed to, or re-enter, the ping stage.

The transition controller 709 may further control the power receiver controller 701 to awaken from the sleep state. The transition controller 709 may for example connect an internal battery to the power receiver controller 701 or may trigger the power receiver controller 701 with a wake-up signal. The power receiver controller 701 may temporarily make use of a local energy storage such as a battery or capacitor to power up.

In other embodiments, the power receiver controller 701 may not be actively switched on by the transition controller 709 but may e.g. switch on in response to receiving the ping signal. Indeed, in some embodiments, the power receiver 205 may comprise no internal power source and consume no power during the standby phase. For example, the standby mode exit request may be transmitted by a user manually switching in or out a capacitor being part of a resonance circuit including the receiver communication inductor 211. This causes a change in the loading of the transmitter communication inductor 209 resulting in the power transmitter proceeding to the ping phase wherein a digital ping is performed. In response, the power receiver 205 may receive a ping power signal which can power parts of the power receiver 205 sufficient for transitioning to the power transfer phase at which stage the power receiver 205 can power-on fully and provide power to the load 703.

It will be appreciated that the receiver communication inductor 211 is also used for communication with the power transmitter 201 and that the power receiver 205, and specifically the power receiver controller 701, may comprises suitable communication circuitry including e.g. a demodulator and modulator.

In many embodiments, the transmitter communication inductor 209 is part of a resonance circuit. Indeed in many embodiments the transmitter communication inductor 209 may form a series or parallel resonance circuit by being coupled in series or parallel with a resonance capacitor (which may be an equivalent capacitor implemented by a plurality of capacitors).

In such embodiments, the detector 403 may typically be arranged to detect an impedance change based on a consideration of the resonance frequency of the resonance circuit. For example, when no standby mode exit request is being transmitted, the resonance circuit may have a first resonance frequency but when the loading of the transmitter communication inductor 209 is changed in connection with the transmission of the standby mode exit request, the resonance frequency of the resonance circuit may change to a second resonance frequency.

In some embodiments, the resonance frequency change may be detected directly, e.g. by performing a frequency scan and detecting an a minimum or maximum current or voltage (depending on whether the resonance circuit is a series resonance circuit or a parallel resonance circuit).

In other embodiments, the detection may be more indirect. For example, the resonance frequency of the resonance circuit when the power transmitter 201 is in the standby phase may be known. Specifically, the resonance frequency of the resonance circuit when the power receiver 205 is present but not transmitting a standby mode exit request may be known. The detector 403 may accordingly generate and apply a test signal having this frequency to the resonance circuit. The corresponding impedance may be measured (e.g. as a current amplitude for a fixed voltage amplitude of the test signal or as a voltage amplitude for a fixed current amplitude of the test signal).

When the power receiver 205 transmits the standby mode exit request, the resonance frequency of the resonance circuit will change due to the change in loading. This will result in a change in the impedance of the resonance circuit and thus in a change of the measured voltage and/or current amplitude. This change may be detected by the detector 403 which accordingly may indicate to the transmitter mode control 405 that a standby mode exit request has been received.

An issue to be addressed by such an approach is that the resonance frequency during the standby phase is different from the resonance frequency during the selection phase where no power receiver is present.

Figure 8:
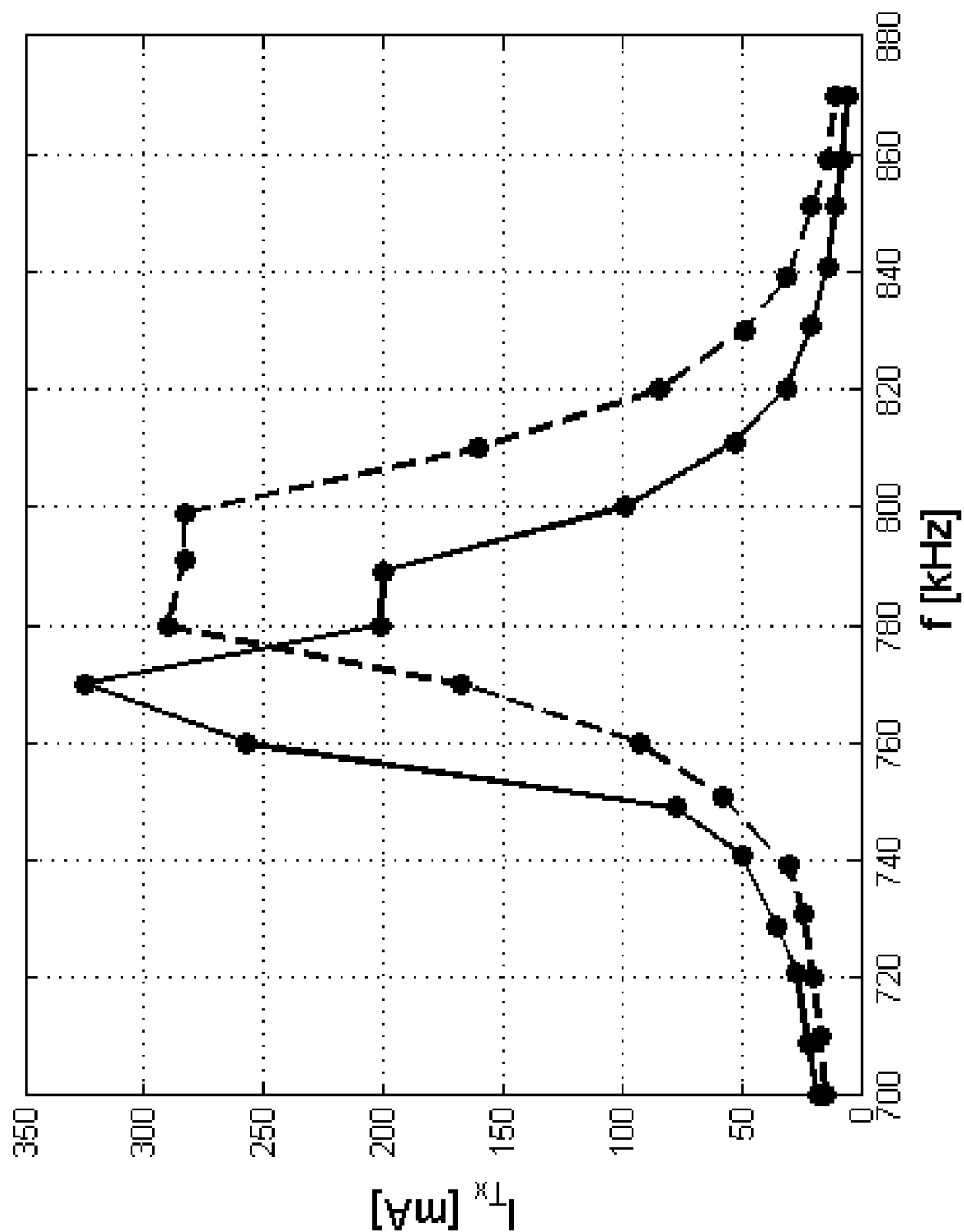
FIG. 8 illustrates an example of responses of resonance circuits with different resonance frequencies.

FIG. 8 illustrates an example of the current through the transmitter communication inductor 209 in different phases for a scenario where the power receiver 205 is part of an appliance which can be positioned on the power transmitter 201.

FIG. 8 illustrates the transmitter communication inductor current for a situation where respectively no appliance (solid line) and a kitchen appliance (dashed line) is placed on top of the power transmitter 201. As shown, when the appliance is placed on top of the power transmitter, the resonance frequency of the power transmitter is shifted from 770 kHz to approximately 790 kHz. Thus, if the current is monitored at 770 kHz, a large current drop of approximately 160 mA is detected. This information is an indication that an object is placed on top of the power transmitter.

Indeed, in the specific example, this change in resonance frequency can be used by the power transmitter 201 to detect that an object is present and it may then proceed to establish a communication channel to find out whether the object is an appliance, and if so whether the appliance needs immediate power or not. The appliance can identify itself as an appliance, but might not need any power for a long period of time. It can communicate this to the power transmitter 201 after which both the power transmitter 201 and the power receiver 205 proceed to the standby phase awaiting a specific power-on activation.

In order to detect any change of the situation, e.g. a shift of the position of the appliance, a placement of a foreign object within the range of the power coil, or the user pushing a button on the appliance which will change the reflected impedance, the power transmitter 201 should adapt to the new situation where the appliance is standing on top of it. As shown in FIG. 8, after an appliance is placed on top of the power transmitter 201, the resonance frequency of the resonance circuit has changed.

However, the actual resonance frequency in the standby phase may depend on a number of features including component tolerances, the exact position of the power receiver 205 (and thus the coupling between the transmitter communication inductor 209 and the receiver communication inductor 211) etc. Therefore, in many embodiments, the resonance frequency in the standby phase may not be known but may be estimated by the detector 403.

This estimation may for example be performed by performing a frequency sweep and determining the maximum or minimum impedance, current or mvoltage (depending on the parameter being measured and whether the resonance circuit is a parallel or series circuit). In the example of FIG. 8, the frequency sweep may specifically detect the maximum current and thus minimum impedance.

Once the resonance frequency has been estimated, the detector 403 may proceed to use this estimate to determine whether the standby mode exit request is being transmitted. For example, the detector 403 may proceed to at regular intervals apply a test signal tuned to the estimated resonance frequency and detect whether the resulting inductor current changes.

In many embodiments, the communication inductor is thus part of a resonance circuit which may have given resonance properties such as a resonance frequency and a quality (Q) factor etc. In such embodiments, the detector 403 may apply an excitation signal to the resonance circuit and the excitation signal may result in oscillations of the resonance circuit. The detector 403 may then detect the response of the resonance circuit and may detect any impedance changes based on this response. Specifically, the detector 403 may measure a voltage and/or current for the transmitter communication inductor 209 and detect the impedance change caused by the load change in response to a change in the voltage and/or current.

In many embodiments, the detector 403 may be arranged to apply an exciation signal to the resonance circuit which comprises one or more excitations. Each excitation may be a signal which causes the resonance circuit to generate oscillations, i.e. to resonate. An excitation may for example be a short impulse, pulse, step or transition which causes the resonance circuit to oscillation. Thus, each excitation may induce energy to the resonance circuit which causes this to oscillate. Furthermore, in many embodiments, the oscillations resulting from an excitation may have a longer duration than the excitation causing the oscillations.

In the following, an excitation signal will be considered wherein an excitation is a voltage or current impulse/pulse provided to the resonance circuit. Furthermore, the excitation signal will comprise a plurality of excitations in the form of pulses. For convenience, the following description will focus on scenarios wherein the resonance circuit is a series resonance circuit, the excitation signal is a voltage signal applied over the series resonance circuit, and the detector 403 measures the current of the series resonance circuit (and thus of the transmitter communication inductor 209).

For each of the pulses, the detector 403 measures the amplitude of the current and based on the value of the amplitude it can proceed to determine whether a standby mode exit request is being transmitted or not, i.e. whether the power receiver 205 has changed the loading of the transmitter communication inductor 209.

Figure 9:
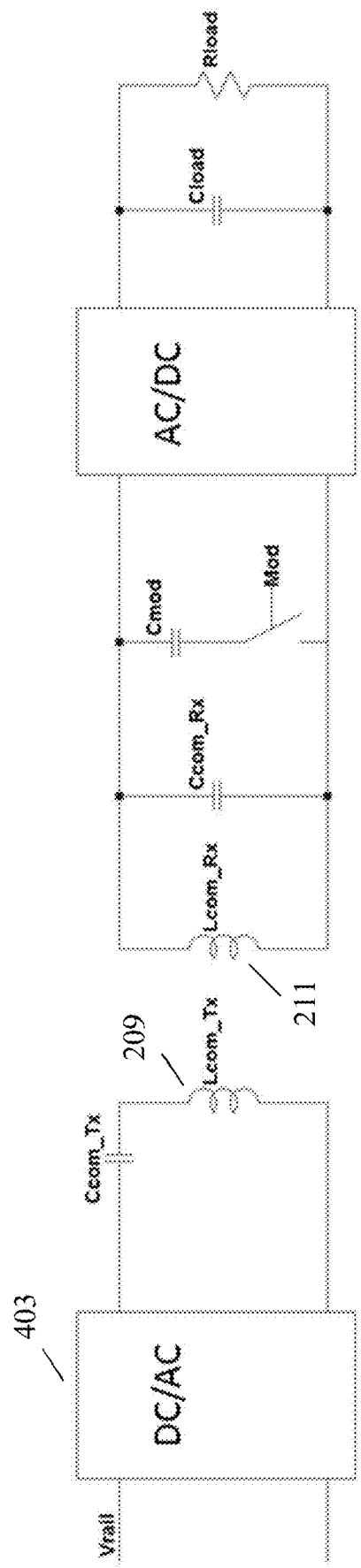
FIG. 9 illustrates an example of elements of a power transfer system in accordance with some embodiments of the invention.

FIG. 9 illustrates an example of elements of the system of FIG. 2 which will be used to describe the approach in more detail. In the example, the detector 403 comprises a DC/AC converter (e.g. similar to the inverters of FIGS. 5 and 6) which is coupled to a series resonance circuit formed by the transmitter communication inductor 209 (Lcom_Tx) and a series capacitor (Ccom_Tx). The receiver communication inductor 211 (Lcom_Rx) is part of a parallel resonance circuit which includes a permanent parallel capacitor (Ccom_Rx) and a communication or modulation capacitor (Cmod) which may be coupled across the permanent parallel capacitor by a switch (mod).

In the example, the receiver communication inductor 211 is further coupled to an AC/DC converter which is coupled to a load formed by a load capacitor (Cload) and a load resistor (Rload).

The example of FIG. 9 has been analyzed by simulation for a scenario wherein the detector 403 generates pulses with a short duration but with a long interval between them.

For example, an analog ping used in the selection phase may at regular intervals detect if a power receiver 205 is present by generating a test signal. However, the intervals between events are much larger than the duration of an event, and the Qi specifications indeed specifically mentions an interval of 500 ms. Since the time between two signals is very long, the measured properties of the resonance circuit are independent for each event, i.e. any oscillations caused by the previous test signal event has died out before the next event.

In the simulation, the self-resonance frequency of the power transmitter resonance circuit is selected to be 650 kHz and the self-resonance frequency of the of the power receiver resonance circuit is selected to be 750 kHz. At the power receiver, the impedance can be changed/modulated with a modulation capacitor (Cmod) of 15 nF.

Figure 10:
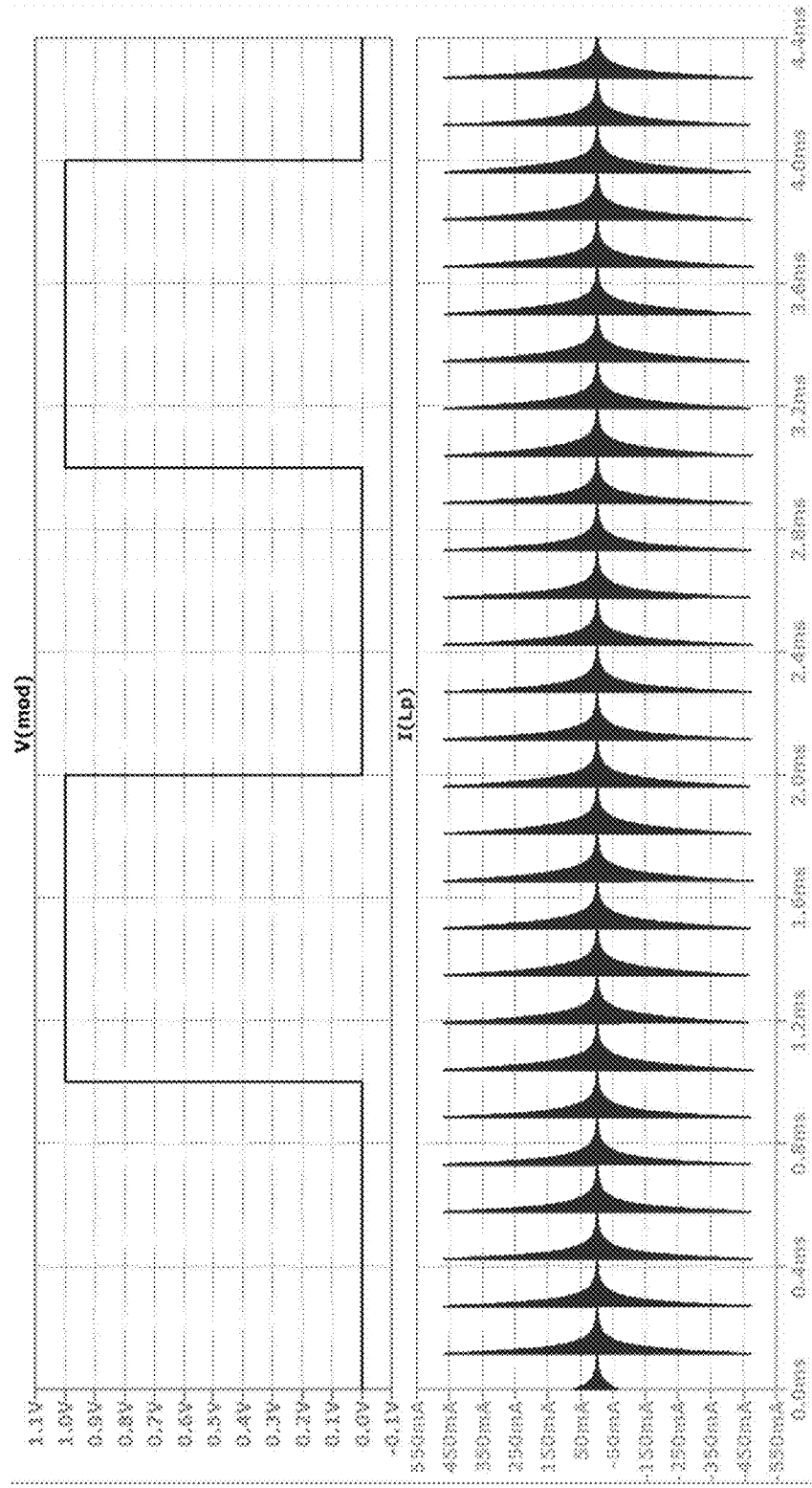
FIG. 10 illustrate examples of signals of a power transfer system in accordance with some embodiments of the invention.

FIG. 10 illustrates a simulation result of the current flowing through the transmitter communication inductor 209 when an appliance is placed on top of the power transmitter. The modulation signal V(mod) controls the communication switch (mod) and thus indicates whether this capacitor is disconnected or coupled across the receiver communication inductor 211. In the example, the detector 403 applies a short pulse with a duration of 10% of the resonance period to the transmitter resonance circuit every 154 µs, i.e. at a repetition rate which is much shorter than the repetition rate of 500 ms mentioned in Annex B-1 of the Qi specifications. However, as illustrated, the oscillations resulting from each pulse finishes before the next pulse causes the next set of oscillations. Thus, in the example, any interference between the response of different excitations is negligible.

Typically, evaluation of the response of a resonance circuit is achieved by measuring the maximum signal level or amplitude signal level, i.e. in the present case by measuring the maximum inductor current.

However, in the example described, the detector 403 is arranged to detect the impedance change in response to a measurement which is performed with a time offset relative to the time of excitation, and thus in the example with a time offset relative to the pulses generated by the detector 403. The detector 403 may specifically measure an amplitude of the current within a time interval being offset relative to the time of the pulses.

In many embodiments, the time offset is no less than 10 and no more than 60 time periods for a resonance of the resonance circuit. Thus, in many embodiments the measurement is performed between 10 and 60 time periods from the generation of the excitation of the resonance circuit, i.e. from the time of the pulse. The time period of the resonance may correspond to the reciprocal of the resonance frequency of the resonance circuit when in the standby mode.

The use of a time offset may provide a substantially more accurate measurement and indeed may allow the detector 403 to detect the impedance change with increased accuracy and reliability.

Indeed, as can be seen from FIG. 10, the oscillations resulting from the excitations are very similar regardless of whether the modulation capacitor is switched in or out. Indeed, FIG. 10 indicates that they oscillations are substantially identical in the two cases.

However, the Inventors have realized that instead of measuring the amplitude of the inductor current (or voltage) when it is maximum, i.e. when the excitation pulse is applied or at the first oscillation peak following the pulse, much more accurate results can be achieved by measuring this with a time offset, such as e.g. by measuring it at the xth oscillation peak where x can be selected to be sufficiently large to provide suitable differentiations yet small enough for the oscillations to still have sufficient amplitude. In many scenarios, a time offset of between 10 and 60 time periods provide such an effect.

Figure 11:
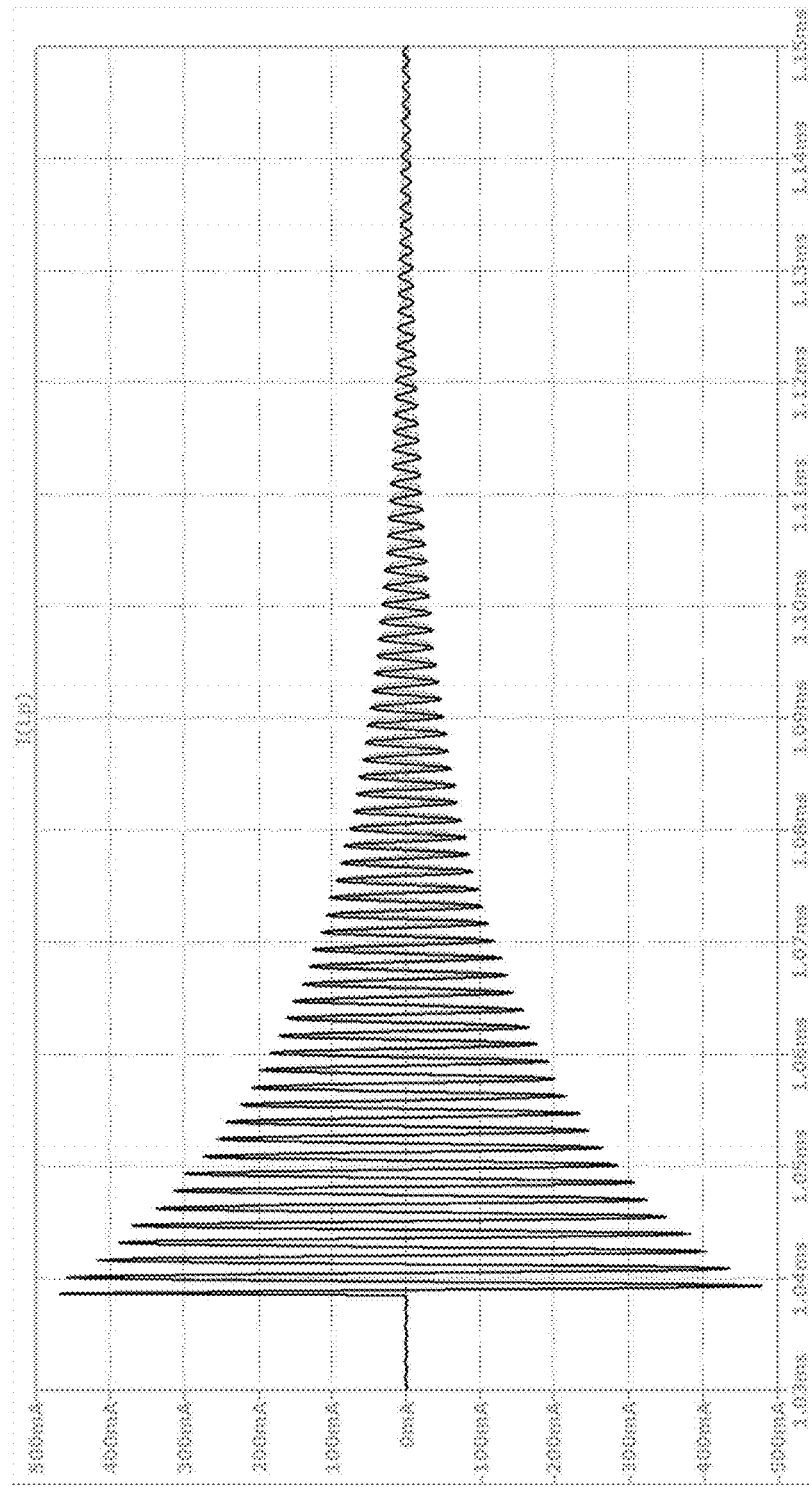
FIG. 11 illustrate examples of signals of a power transfer system in accordance with some embodiments of the invention.
Figure 12:
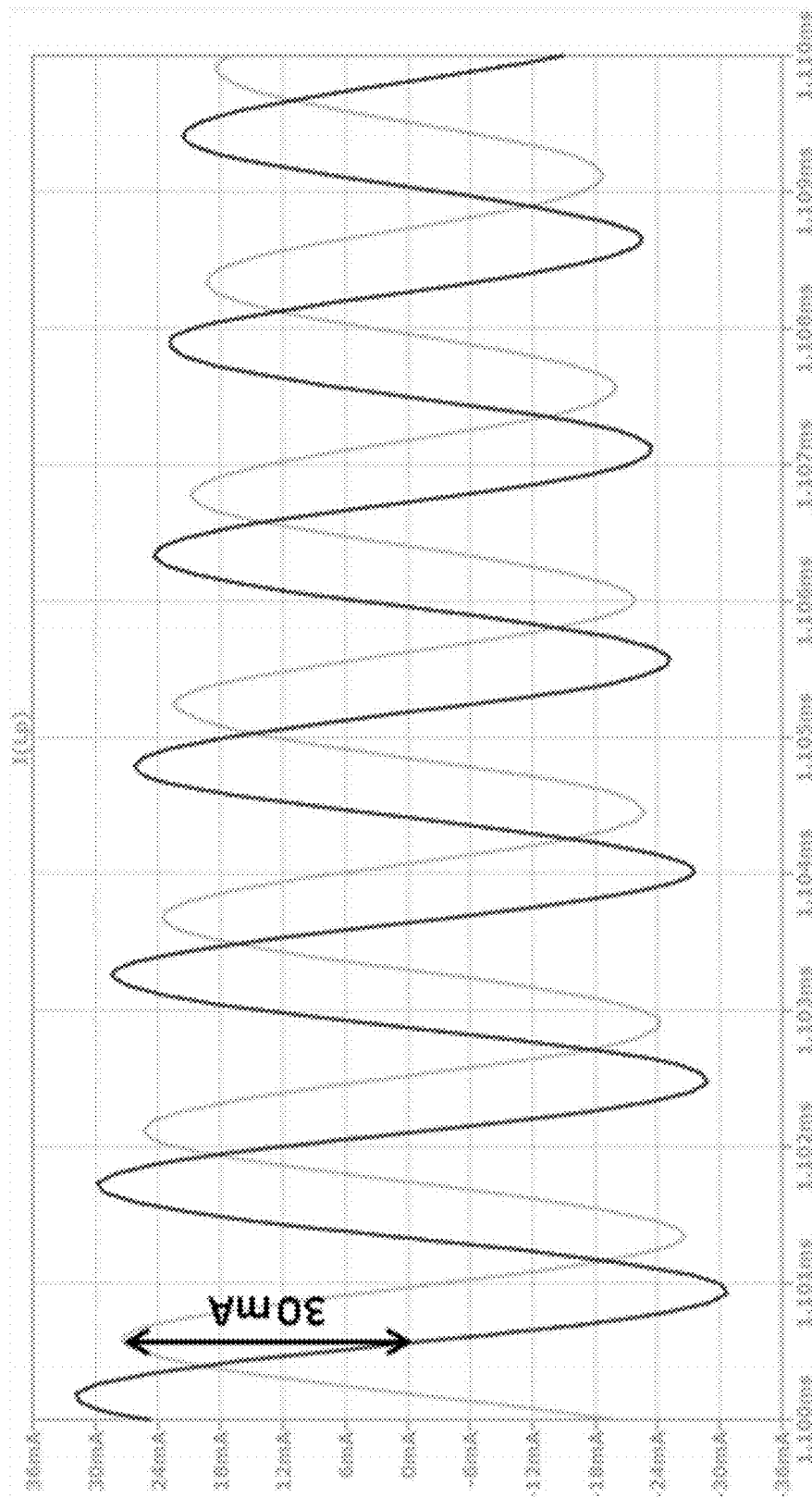
FIG. 12 illustrate examples of signals of a power transfer system in accordance with some embodiments of the invention.

FIGS. 11 and 12 illustrate the current oscillation generated as a result of a single pulse. As shown, if the current is measured at one of the first oscillation peak (i.e. x smaller than 10), almost no amplitude difference is detected when the wake-up signal is applied. On the other hand, if the current is measured after a very large number of oscillations have occurred, the current has a very small amplitude which can be considered to be equal to 0 (typically more than 100 oscillations). Thus, the standby mode exit request cannot accurately be detected immediately after a pulse has been applied or after a sufficiently long time interval. However, if the current is measured at the xth oscillation peak, x being not too large and not too small, an amplitude difference is detectable. It has been observed that x may advantageously typically be in the range of 10-60.

More specifically, FIG. 11 illustrates an example where the oscillations for respectively an excitation wherein the modulation capacitor is disconnected and one where it is connected are overlaid each other. FIG. 12 illustrates a close-up for a time interval which is offset relative to the time of excitation. Initially, the oscillations follow each other closely and there is little differentiation. However, as illustrated by FIG. 12, the differentiation becomes much larger later on, and for the section shown in FIG. 12, differentiation between the two scenarios is possible by measuring the amplitude current value at a suitable time. Indeed, in some embodiments, a differentiation may possibly be achieved in response to the phase of the inductor current. Thus, in the example of FIGS. 11 and 12, a substantially improved detection can be achieved by the measurement being performed with a time offset relative to the time of the excitation.

In some embodiments, the detector 403 is arranged to generate the excitation signal to include repeated excitations where the time offset between the excitations is such that oscillations of the resonance circuit for two consecutive excitations interfere with each other. Thus, the repetition frequency is sufficiently high for the oscillations caused by the excitations interfere with each other.

The excitations may thus occur sufficiently frequently for the oscillations resulting from one excitation to not have died out before the next excitation is generated, and thus before the oscillations caused by this excitation begins. The oscillations thus overlap each other and form a superposition resulting in a combined signal.

In many embodiments, the repetition frequency is sufficiently high for the amplitude of oscillations from a previous excitation to be dampened by no more than 90% (or indeed 70% or 50% in some embodiments) when the next excitation occurs. The amplitude of the oscillations for one excitation may be at least 10% (or 20% or 50% in some embodiments) of the initial amplitude when the next excitation occurs.

The application of repeating excitations that are very close together and result in overlapping oscillations may provide a more reliable and often facilitated detection of an impedance change for the transmitter communication inductor, and thus of a change in the electromagnetic environment.

In the embodiments, the power transmitter 201 applies a very short pulse to the transmitter communication inductor 209 at regular intervals such that a new pulse is applied before the current oscillations through the transmitter communication inductor 209 have faded away. The current (or the voltage) may e.g. be measured when the pulse is applied, at the oscillation peak following the pulse, or may possibly be measured with a time offset relative to the application of the pulse.

The Inventors have specifically realized that when the repetition interval is reduced such that a new pulse is generated before the oscillations of the previous pulse have faded away, a significant change in the amplitude of the current through the transmitter communication inductor 209 results from the change of the reflected impedance due to the modulation by changing e.g. a load capacitance in the power receiver 205. The repetition interval is selected such that the amplitude of the oscillations of the previous pulse are still significant.

Figure 13:
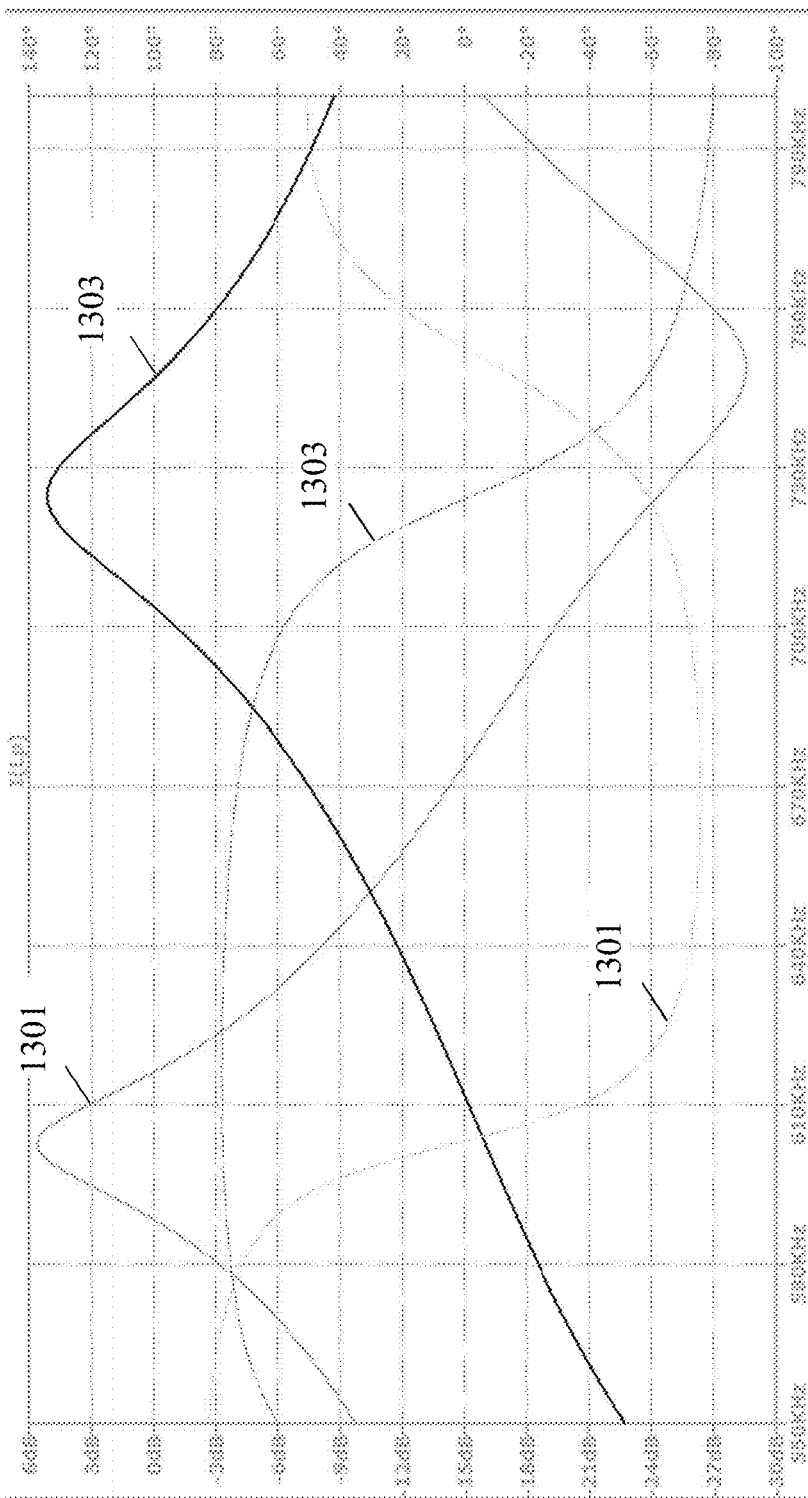
FIG. 13 illustrate examples of signals of a power transfer system in accordance with some embodiments of the invention.

FIG. 13 illustrates simulation results for the system of FIG. 9. The amplitude and phase of the current flowing through the transmitter communication inductor (209) is shown for the case where the modulation switch is open (curves 1301) and closed (curves 1303). As can be seen, although the resonance frequency of the resonance circuit is set to 650 kHz when no object is positioned on its surface, the resonance frequency of the resonance circuit is approximately 600 kHz when the modulation switch is open and approximately 725 kHz when the modulation switch is closed.

When the appliance comprising the power receiver 205 is placed on the surface of the power transmitter 201, the power transmitter 201 should adapt to the new situation. A resonance frequency of approximately 600 kHz should therefore be considered when monitoring for a standby mode exit request from the power receiver 205.

Figure 14:
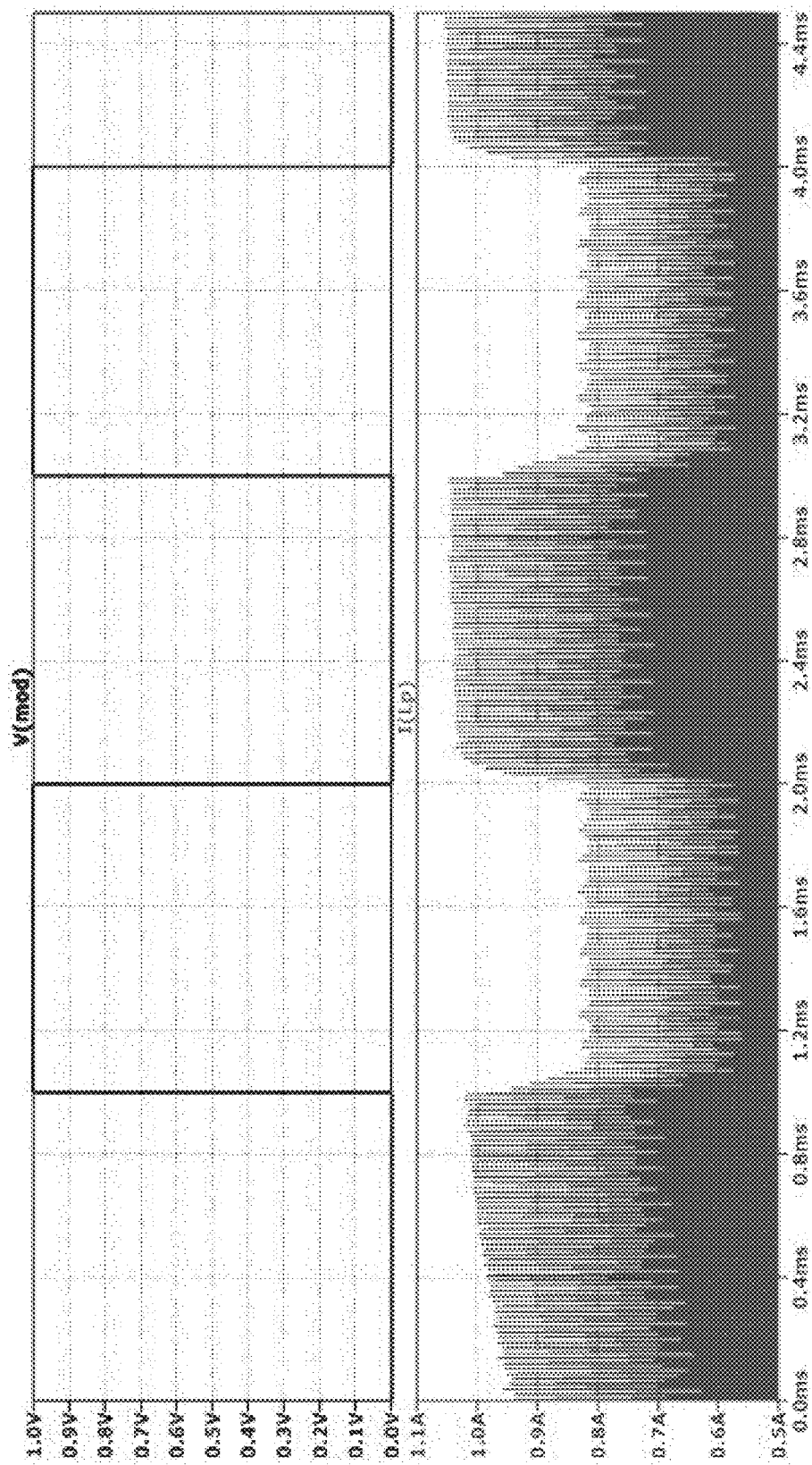
FIG. 14 illustrate examples of signals of a power transfer system in accordance with some embodiments of the invention.

FIG. 14 illustrates simulation results for the system of FIG. 9 for an example wherein a new excitation pulse is applied every 10 cycles (1 cycle=$T_{res}$). As shown in FIG. 13, the resonance frequency of the resonance frequency is approximately equal to 600 kHz when the power receiver 205 is placed on the surface of the power transmitter 201. However, in order to exactly determine the resonance frequency, the applied resonance frequency may swept around 600 kHz (e.g. between 580 kHz and 620 kHz, or between 550 kHz and 650 kHz) and the amplitude of the current flowing through the transmitter communication inductor 209 is measured without the power receiver 205 applying any modulation. The frequency at which the amplitude is at a maximum corresponds to the resonance frequency of the resonance circuit. This frequency is then used to monitor for the standby mode exist request from the power receiver 205.

In FIG. 14, the amplitude of the current flowing through the transmitter communication inductor 209 is maximum at 596 kHz. Thus, a resonance frequency of 596 kHz has been detected. A new pulse is therefore applied at every 10 cycles, where 1 cycle=1/596 kHz. As can be seen a very substantial change in the amplitude of the inductor current depending on the modulation capacitor is present. Indeed, in the specific example, an amplitude change of approximately 225 mA is induced by the reflected impedance change. Specifically, when the loading is changed due to the standby mode exit request being transmitted, the resonance frequency changes (in this case to approximately 725 Hz as shown in FIG. 13). This results in a reduced amplitude.

Figure 15:
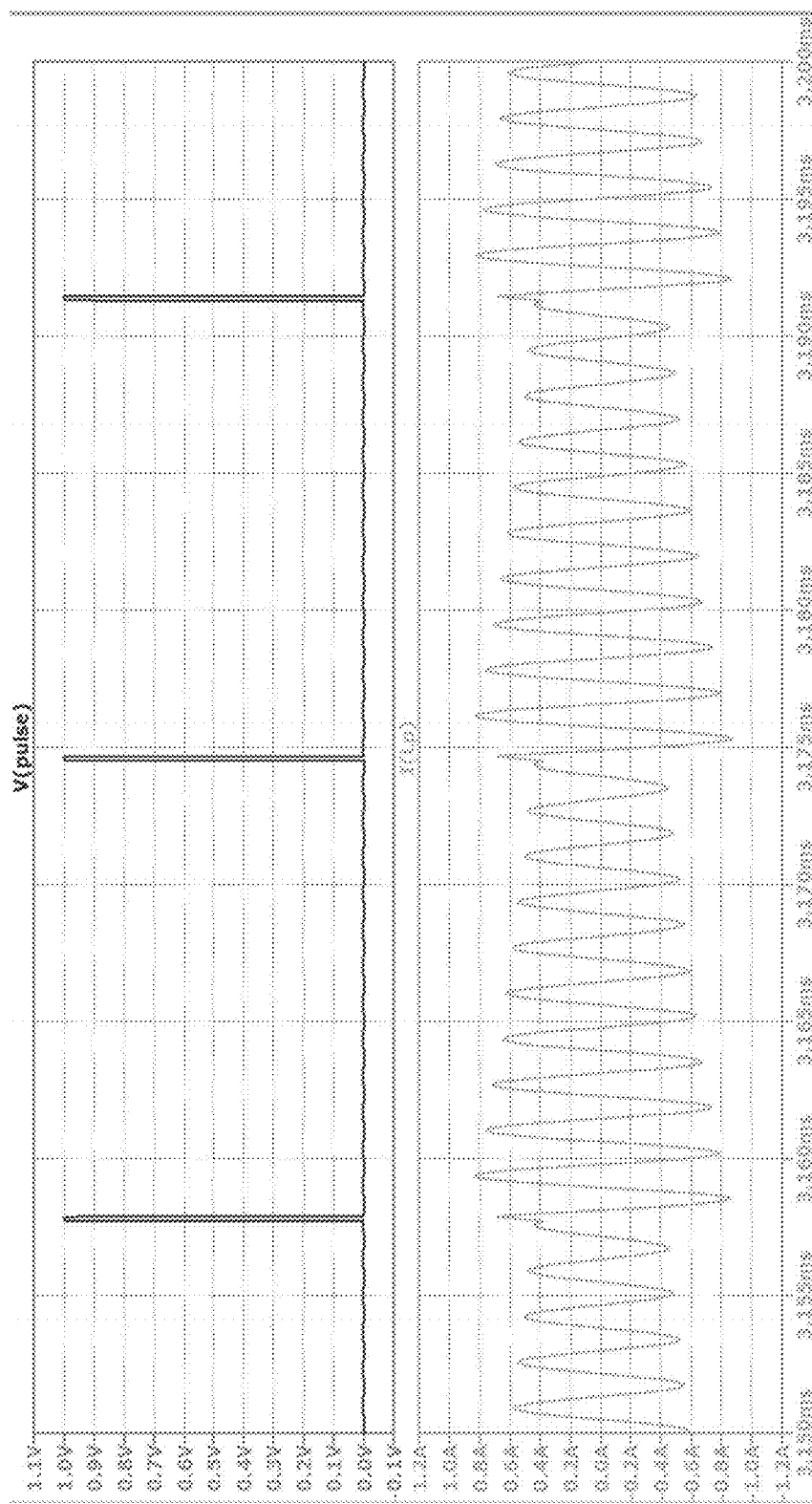
FIG. 15 illustrate examples of signals of a power transfer system in accordance with some embodiments of the invention.

FIG. 15 illustrates a short time interval of FIG. 14 and further illustrates the individual excitation pulses. As can be seen, the maximum amplitude of the current can be measured at the first oscillation following the pulse. In some cases, the maximum amplitude could occur when the pulse is applied. Thus, the current could also, in these cases, be measured at this instant in time (i.e. when the pulse is applied).

Figure 16:
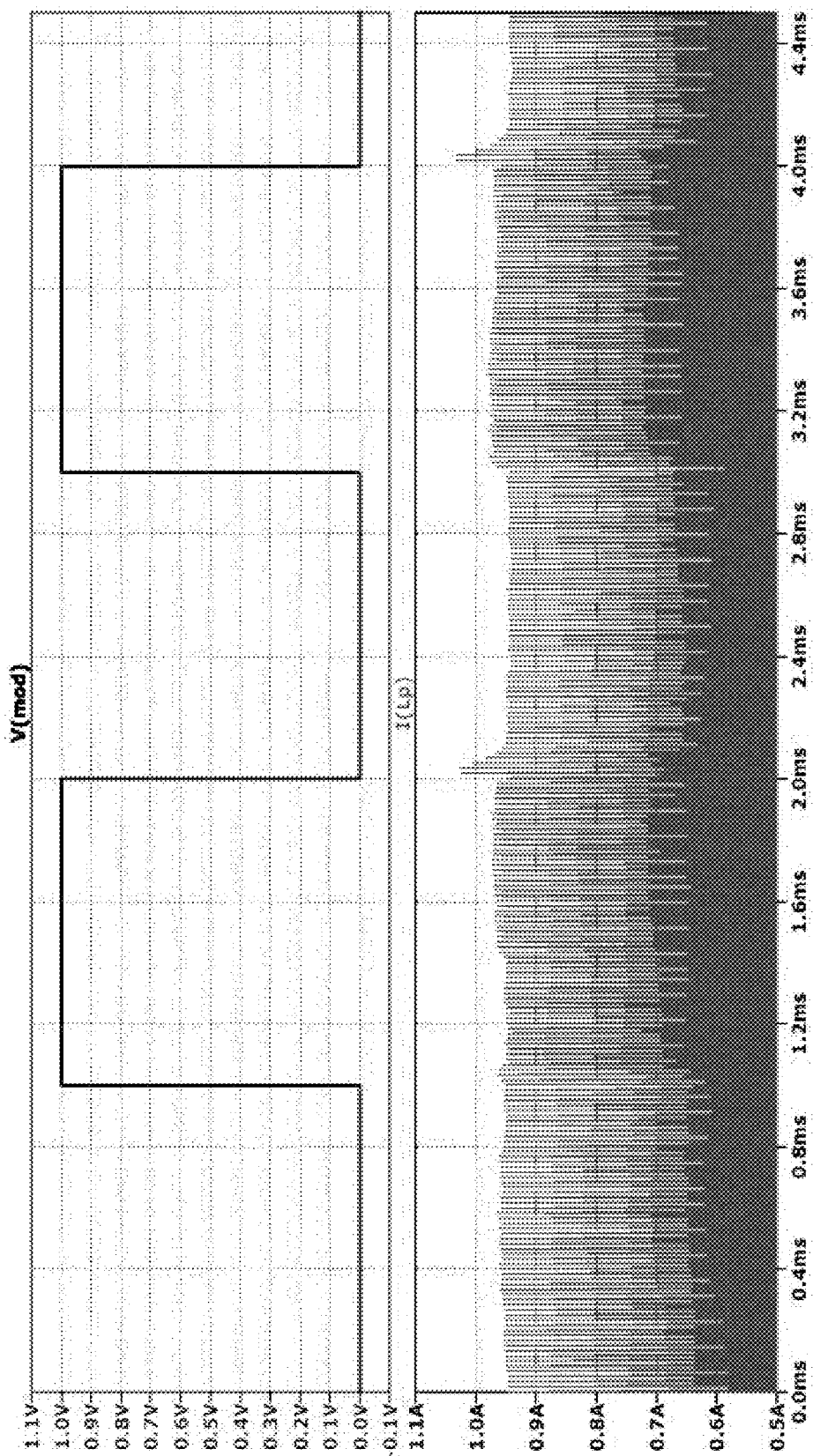
FIG. 16 illustrate examples of signals of a power transfer system in accordance with some embodiments of the invention.

FIG. 16 illustrates simulation results for the system of FIG. 9 for an example wherein a new pulse is applied every 10 cycles of a frequency which is not exactly the same as the resonance frequency. Thus, in the example, the driving of the resonance circuit is not not correctly tuned to the actual current resonance frequency of the resonance circuit. In the specific example, the assumed resonance frequency (to which the excitation pulses are tuned) is not the actual resonance frequency and this may result in a reduced amplitude difference when the standby mode exit request is transmitter. Indeed, for the specific example, the assumed resonance frequency is 599.75 kHz and this results in a scenario where the exit request is not (or hardly) detectable.

In many embodiments, the detector 403 may be arranged to estimate a resonance frequency of the resonance circuit; and to synchronize the excitation pulses to the estimated resonance frequency. The estimation of the resonance frequency may e.g. be based on a frequency sweep signal and detecting the response of the resonance circuit.

In some embodiments, the detector 403 may be arranged to adapt a repetition interval for the repeated excitations based on an amplitude of at least one of a communication inductor voltage and a communication inductor current. Thus, the detector 403 may measure the voltage or current of the transmitter communication inductor 209 and adapt the repetition frequency accordingly. Specifically, the detector 403 may be arranged to adapt the repetition interval to maximize the at least one of the communication inductor voltage and the communication inductor current.

For example, the detector 403 may measure an amplitude of the current through the transmitter communication inductor 209 during a time interval of the standby phase. The amplitude may in some embodiments be averaged over a suitable time interval (which is typically short in comparison to the speed of the adaptation). The detector 403 may then sweep the repetition frequency over a suitable frequency interval and detect the maximum amplitude value. The repetition frequency may then be set to the corresponding frequency. As another example, the detector 403 may implement a feedback control loop which drives the repetition frequency towards a maximum for the amplitude.

The approach may allow improved performance and may specifically allow the system to adapt to the current conditions including component changes, variations in the specific position of the power receiver 205 relative to the power transmitter 201, etc.

In the approach, the power transmitter 201 may thus tune the interval in a certain range in order to measure the largest amplitude or amplitude change possible. Thus, this approach may optimize the detection method.

It may be desired to have a repetition frequency synchronized to a resonance time period. The exact relationship between the repetition frequency and the resonance time period may depend on a number of factors including harmonics of the driving signal etc. Accordingly, the ratio between the excitation pulse repetition frequency and the resonance frequency need not be an integer but may in principle be any real number.

Typically, the power transmitter 201 will not know the exact resonance frequency and in this case it may assume a certain frequency f. The power transmitter 201 may then sweep in a certain range around this frequency (while applying the pulses) and monitor the measured amplitude or amplitude change. The frequency at which the largest amplitude or amplitude change is measured corresponds to the resonance frequency of the power transmitter:

$$T=n*T_{res}=n/f_{res}=n/f$$

In the following, some specific implementations will be described in more detail.

Figure 17:
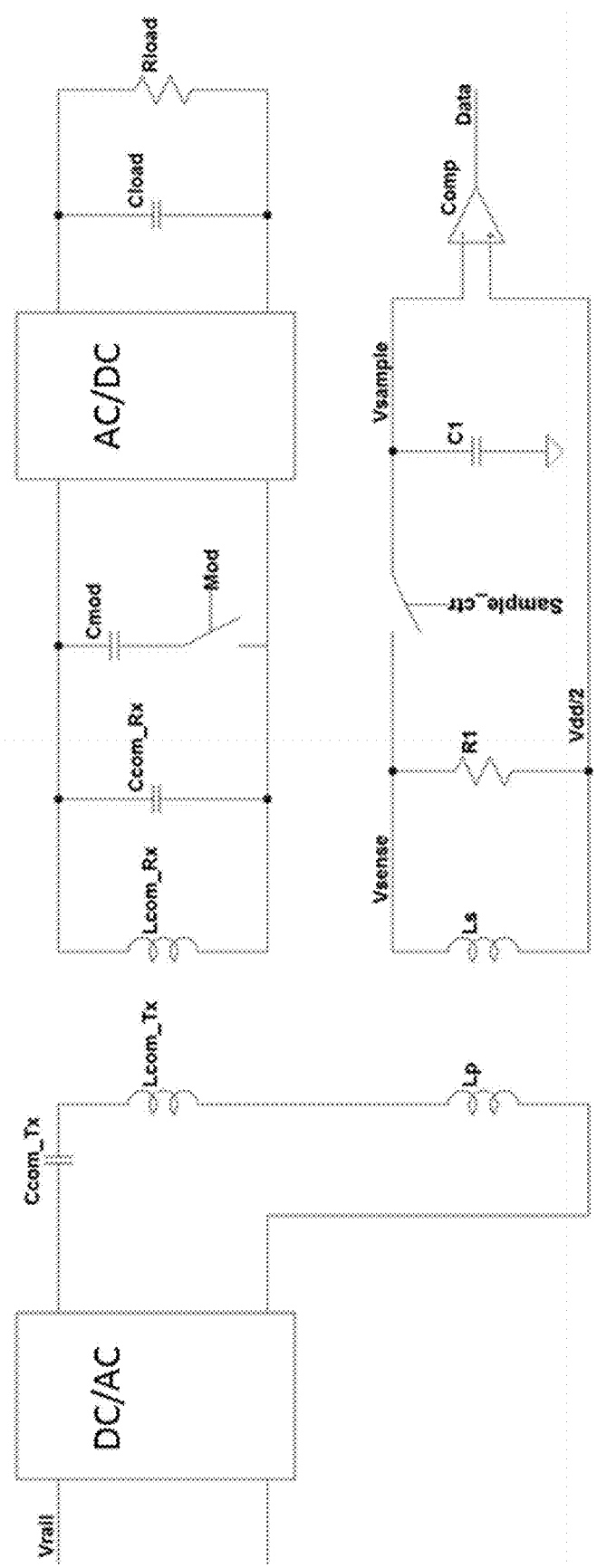
FIG. 17 illustrate examples of elements of a power transfer system in accordance with some embodiments of the invention.

FIG. 17 illustrates an example of an implementation of detection functionality of the wireless power transfer system. In the example, a transformer (Lp and Ls) converts the current flowing through the transmitter communication inductor Lcom_Tx to a voltage Vsense. This voltage is then sampled at the peak of the $40^{th}$ oscillation. The sample signal (Vsample_ctr) is generated by the controller of the power transmitter. The sampled voltage Vsample is then compared to a DC voltage (typically equal to Vdd/2).

Figure 18:
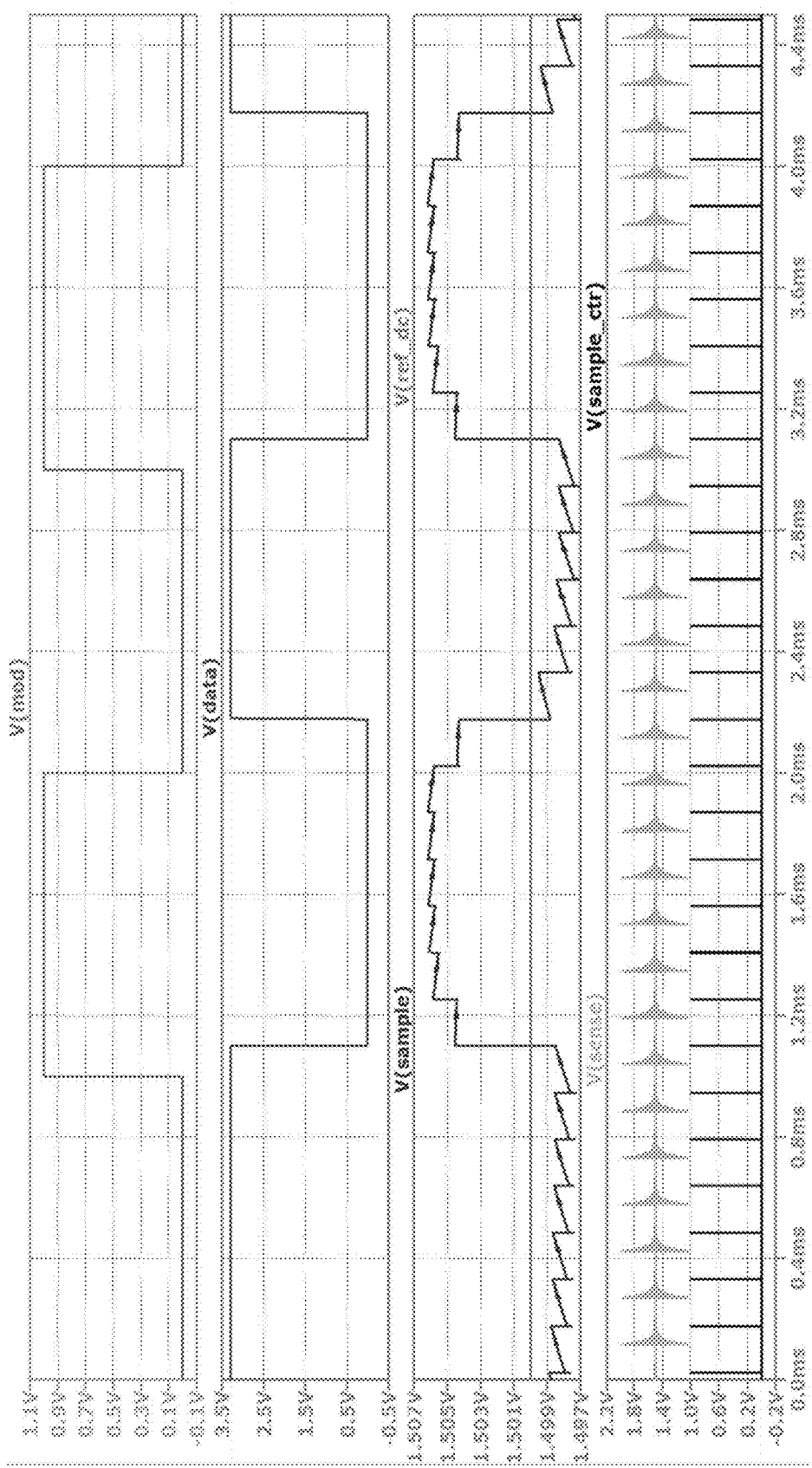
FIG. 18 illustrate examples of signals of a power transfer system in accordance with some embodiments of the invention.

FIG. 18 illustrates simulation results of the system of FIG. 17 using the same parameters as previously. In the example, the current through the transmitter communication inductor is first converted into a voltage Vsense. This voltage is then sampled at the $40^{th}$ oscillation peak. The sampled voltage Vsample is then demodulated by a simple comparator. As observed, the standby mode exit request is correctly detected. FIG. 18 specifically illustrates (from top to bottom): the modulation signal, the decoded signal value (whether the standby mode exit request is present or not), the demodulated signal and the DC reference voltage, and the sensed voltage and the sample signal.

The previous examples have focused on the current through the transmitter communication inductor 209 and resonance circuit being measured (at certain instant in time) in order to detect the standby mode exit request. As an alternative, the voltage across the transmitter communication inductor 209 could also be measured.

Figure 19:
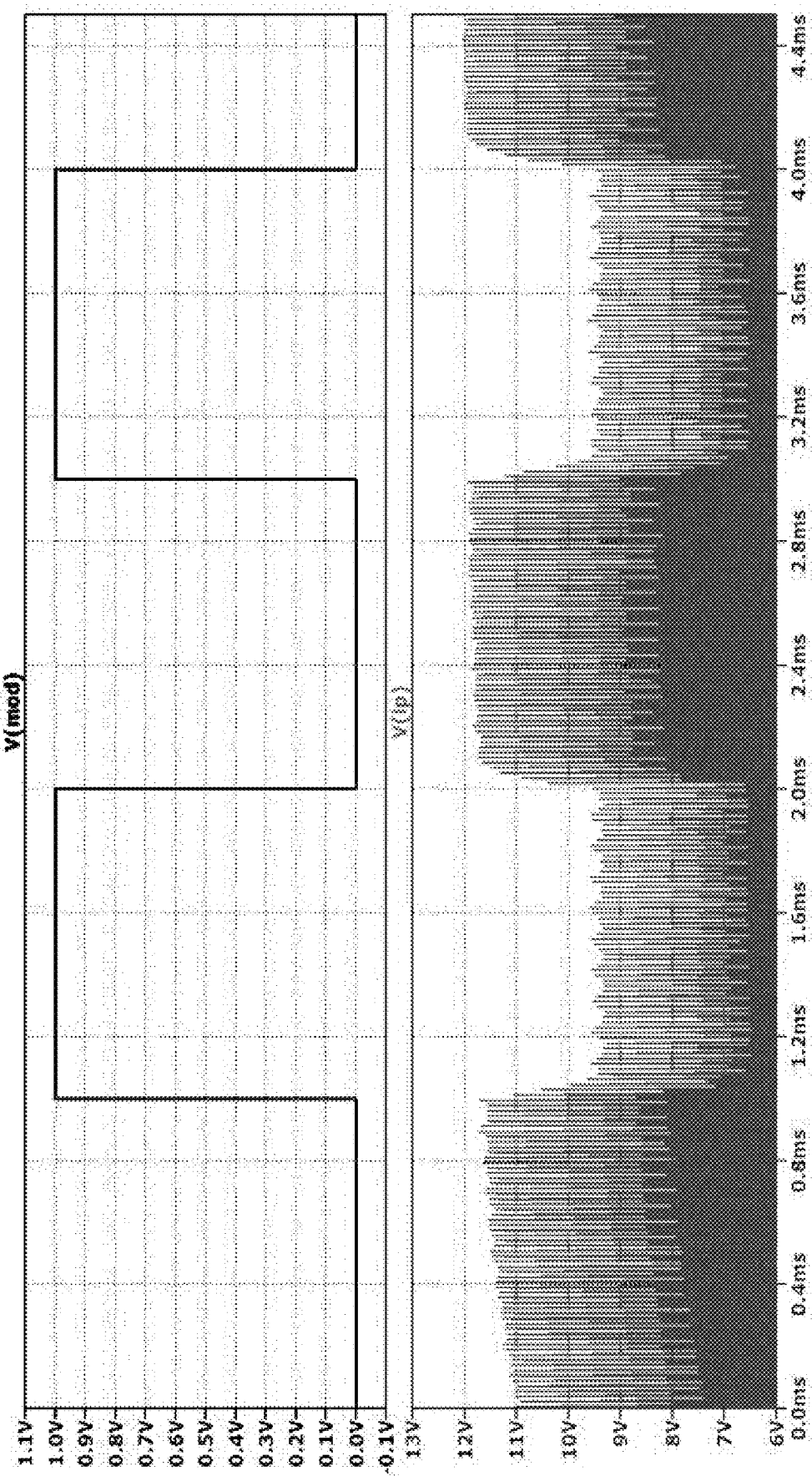
FIG. 19 illustrate examples of signals of a power transfer system in accordance with some embodiments of the invention.

FIG. 19 illustrates an example of the voltage across the transmitter communication inductor using the same parameters as for FIG. 14. In the specific example, a voltage change of approximately 2.5 V results when the standby mode exit request is transmitted. The standby mode exit request can therefore be detected by measuring the voltage across the primary coil of the communication circuitry.

Figure 20:
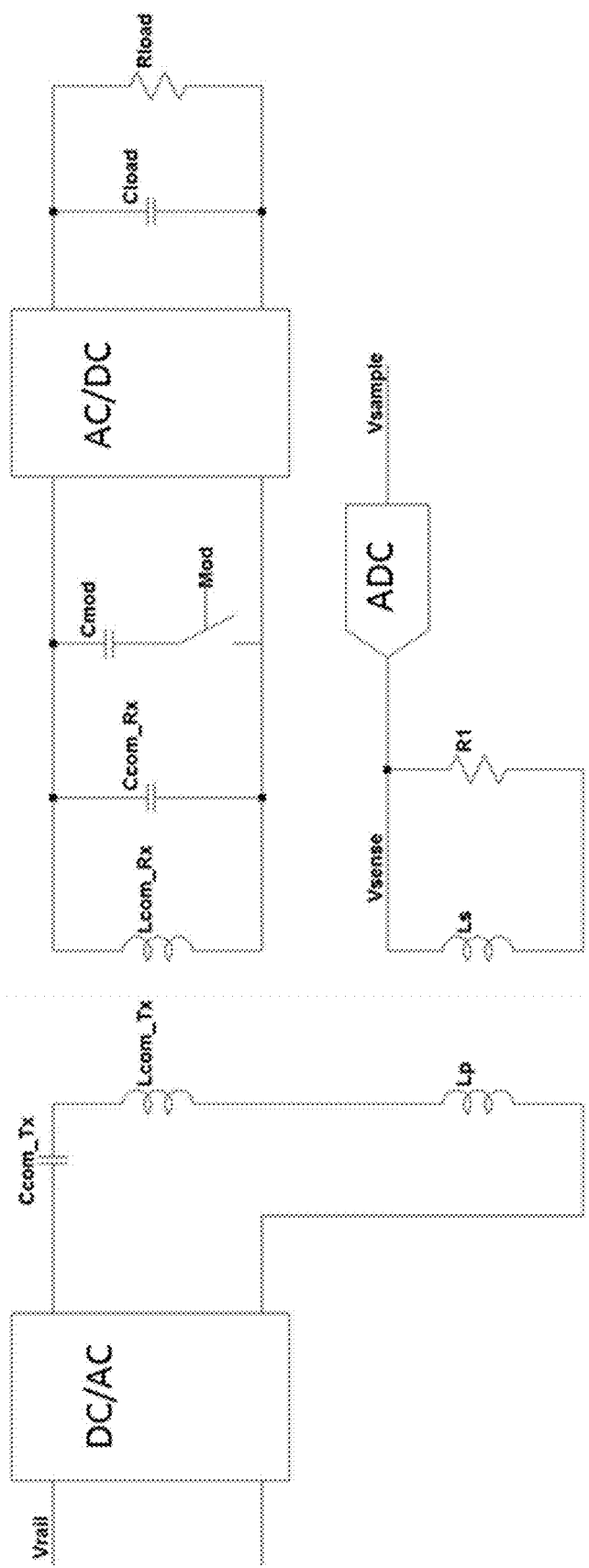
FIG. 20 illustrate examples of elements of a power transfer system in accordance with some embodiments of the invention.

FIG. 20 illustrates an alternative implementation to that of FIG. 20. As for the approach of FIG. 20, the current through the transmitter communication inductor is first converted into a voltage Vsense. This voltage is then converted to a digital signal Vsample. This sampled signal is then provided to an internal microcontroller/microprocessor of the power transmitter. This microcontroller has knowledge of the exact timing of the applied pulse. Thus, the analog-to-digital converter (ADC) can be sampled at this exact time. In this case, the current at the instant in time when the pulse is applied may be measured.

Similarly to the system of FIG. 20, the system of FIG. 20 may also measure the signal at the xth (e.g. $40^{th}$) oscillation peak. The power transmitter 201 can tune the sampling time of the ADC until it measures the local maximum value at the xth oscillation peak. For example, if the current at the first oscillation peak is measured, the time difference between the applied pulse and the first oscillation peak corresponds to approximately one period of the resonance frequency of the power transmitter. The power transmitter can tune the sampling time until it finds a maximum value at one oscillation period after the applied pulse.

When in the standby phase, the power receiver 205 is not powered and often this state may be characterized by the fact that any internal microcontroller of the appliance is not powered.

Figure 21:
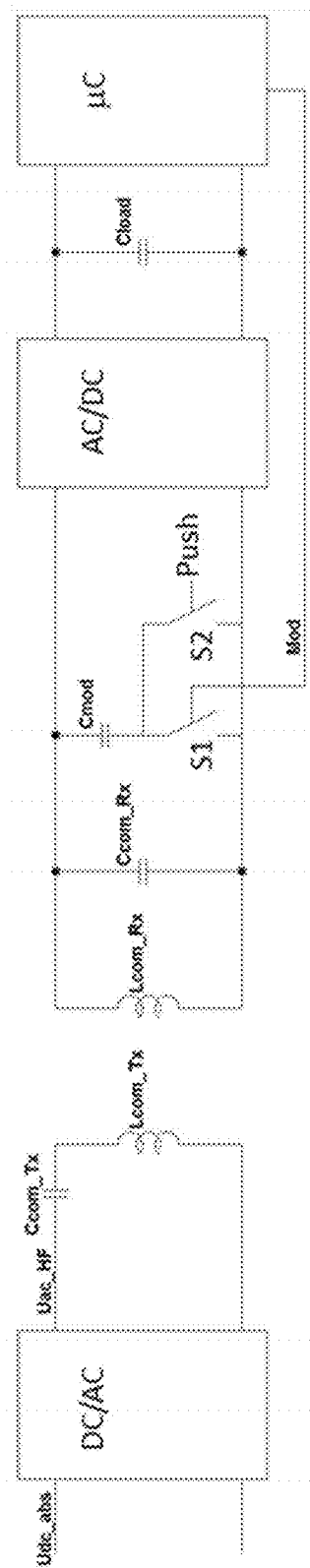
FIG. 21 illustrate examples of elements of a power transfer system in accordance with some embodiments of the invention.
Figure 22:
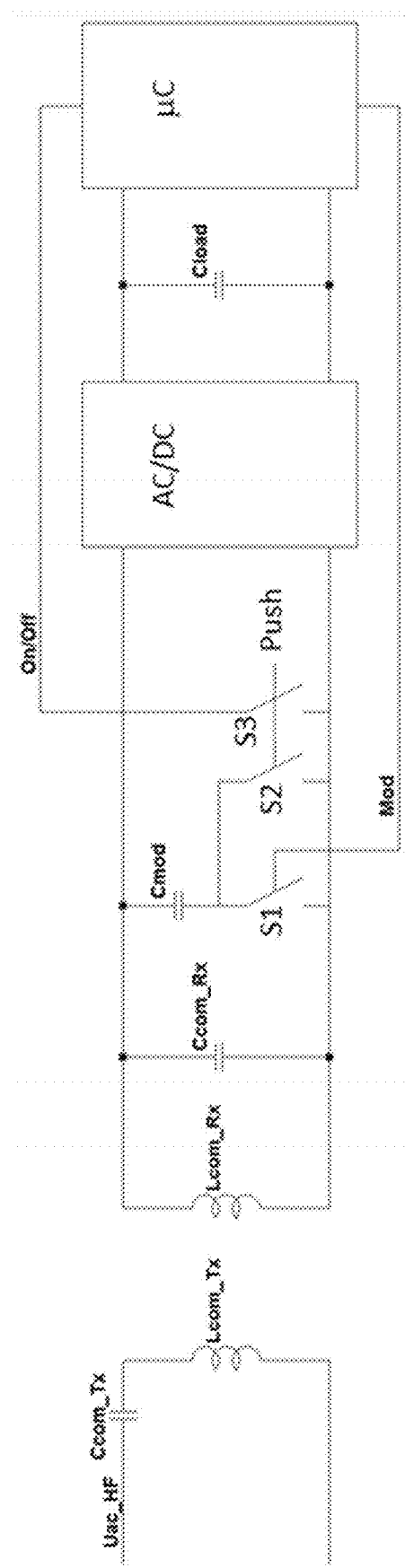
FIG. 22 illustrate examples of elements of a power transfer system in accordance with some embodiments of the invention.

As mentioned previously, the approach may be based on a user triggering an impedance change in the appliance communication circuitry that can be detected by the power transmitter. Thus, this impedance change forms the standby mode exit request. FIG. 21 illustrates a possible embodiment of this approach. A push-button switch S2 is implemented in parallel to the communication/modulation switch S1. Thus, when the user presses the push-button switch, the impedance change that is generated (Cmod connected) can be monitored by the power transmitter. This implementation provides a way to send a standby mode exit request that does not involve a microcontroller of the power receiver. Moreover, the only additional component that is required is a push-button. Thus, the increase in the bill of materials is very small.

It has to be noticed that the switch can be used in other way such as e.g. to short-circuit the receiver communication inductor.

Figure 23:
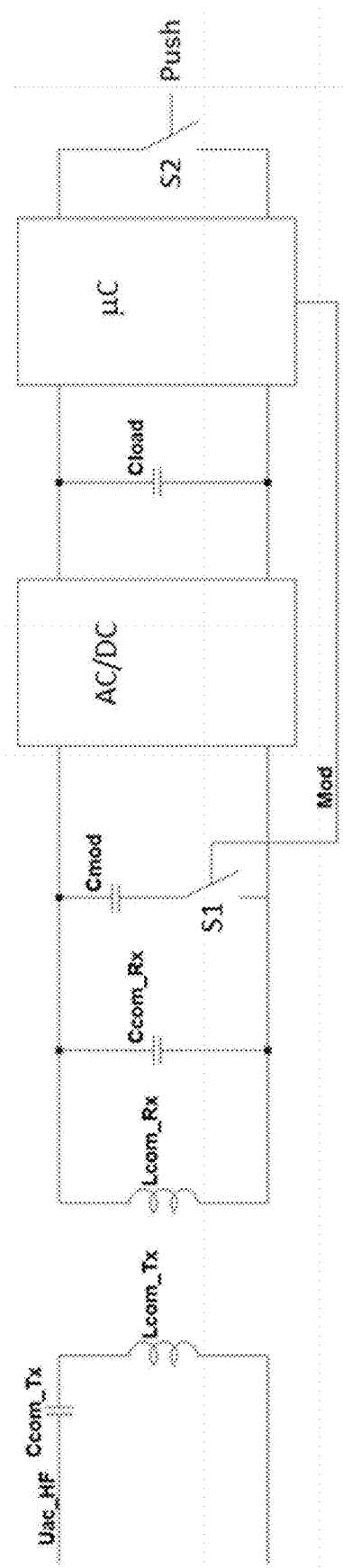
FIG. 23 illustrate examples of elements of a power transfer system in accordance with some embodiments of the invention.

An alternative circuit implementation is illustrated in FIG. 23 where a double gang push-button switch (S2 and S3) is implemented instead of simple push-button switch. This may further provide information to the microcontroller such as when the appliance should be switched off.

Pressing S2/S3 double ganged may e.g.:
1. Physically interrupt any ongoing data transfer between the power transmitter to the power receiver by S2 shorting/loading the data signal. This data interruption can be detected by the power transmitter and interpreted as a power down/fail state in turn shutting down the power transmitter.
2. S3 will close causing an interrupt to the microcontroller of the power receiver. This could initiate a controlled power down and further may communicate status information to the power transmitter.
3. If for any reason the power transmitter fails to recognize the data interruption/Load modulation the microcontroller could further:
   a. Send an OFF message to the power transmitter.
   b. Disconnect the power inductor via a safety relay.

If the power receiver is maintained at least partly powered, that is if e.g. enough energy is stored in, and a sufficient voltage level is maintained at, the load capacitance (Cload) in order to keep the microcontroller in a STANDBY state or an ON state, the microcontroller can directly generate the standby mode exit request.

FIG. 23 illustrates a possible example of such an approach. The user triggers the microcontroller through a switch S2 (which it will be appreciated may e.g. be implemented as a touch sensitive button or e.g. touch sensitive screen). Once the microcontroller has detected the trigger generated by the user, it could wake-up from standby and once being awake it can send the standby mode exit request to the power transmitter. This can be done passively as shown in FIG. 23. In this case, the microcontroller can simply toggle the communication/modulation switch S1.

In the previous description, the standby mode exit request is transmitted merely as a single bit flag which indicates that the power receiver 205 requests that the power transmitter 201 exits the standby phase and initiates a transition to the power phase. However, in some embodiments, the standby mode exit request may comprise control data which can be used to adapt the transition from the standby mode to the power transfer mode.

For example, the standby mode exit request may include data which indicates a requested initial power level, and the power transmitter 201 may be arranged to initialize the power transfer phase with this power level. The standby mode exit request may for example be transmitted with a series of impedance changes with the pattern of changes indicating the control data.

Thus, in some embodiments, the power receiver 205 may send a standby mode exit request which consists of a whole message containing several bits. The load modulation demodulation circuit used for the standard communication between the appliance and the power transmitter could in this case be used to decode this data. To save energy, the power transmitter 201 may keep the demodulation circuit in-active in standby mode, but once an impedance change is detected, e.g. caused by a pre-amble of the standby mode exit request, the impedance detection unit can wake-up the demodulator circuit to demodulate the remaining part of the pre-amble and the standby mode exit request.

In the previous description, the detection of the impedance change based on the resonance frequency of a resonance circuit is used to detect a standby mode exit request from the power receiver to a power transmitter. This provides a particularly advantageous approach and functionality which may provide improved performance, flexibility, and additional or improved user experiences.

However, it will be appreciated that the detection approaches described are not necessarily limited to such a detection but may in principle be used to detect other changes of impedance variations of an inductor of a power transmitter. For example, the approach of generating an excitation signal with excitations that result in overlapping pulses could improve impedance detection for other applications, such as for example for foreign object detection or for detecting that a power receiver is positioned on a power transmitter. As such, the use of an excitation signal causing overlapping pulses could potentially be used e.g. in the selection phase to detect the presence of a power receiver.

Thus, independently of the features and aspects of the standby phase and the standby mode exit request transmission/reception, the approach of generating an excitation signal with excitations generating overlapping oscillations could be used in other wireless power transfer systems.

For example, there could be provided a wireless power transfer system including a power transmitter arranged to provide a power transfer to a power receiver via a wireless inductive power transfer signal generated by the power transmitter, wherein the power transmitter comprises: an inductor; a detector for detecting an impedance change of the inductor; wherein the inductor is part of a resonance circuit and the detector is arranged to apply an excitation signal to the resonance circuit and to detect the impedance change from a measurement of at least one of an inductor voltage and an inductor current, the excitation signal comprising repeated excitations and the excitations having a time offset resulting in interference between oscillations of the resonance circuit for two successive excitations.

The inductor may be a power transfer inductor and/or may e.g. be a transmitter communication inductor.

The impedance change may for example be used to detect a presence or proximity of an object. Specifically, an object detector may be arranged to detect an object in response to the impedance change meeting a detection criterion.

In such a system, the detector may be arranged to adapt a repetition interval for the repeated excitations based on an amplitude of at least one of an inductor voltage and an inductor current.

In such a system, the detector may be arranged to adapt the repetition interval to maximize the at least one of the inductor voltage and the inductor current.

In such a system, the power transmitter may be arranged to measure the at least one of the inductor voltage and the inductor current with a time offset relative to a time of an immediately preceding excitation.

In such a system, the time offset may be no less than 10 and no more than 60 time periods for a resonance of the resonance circuit.

In such a system, the detector may be arranged to synchronize the repeated excitations to multiples of time periods for a resonance of the resonance circuit.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   a communication inductor, wherein the communication inductor is configured to communicate with a power receiver;
   a detector,
     wherein the detector is configured to detect an impedance change of the communication inductor, wherein a presence of the power receiver is detected by the impedance change but no power transfer signal is generated when the power transmitter is in a standby mode, wherein the power transmitter is configured to provide a power transfer to the power receiver via a wireless inductive power transfer signal, wherein the wireless inductive power transfer signal is generated by the power transmitter when the power transmitter is in a power transfer mode; and a transmitter mode controller, wherein the transmitter mode controller is configured to initiate a transition from the standby mode to the power transfer mode in response to the detector detecting the impedance change, wherein the communication inductor is connected to a capacitor to form a resonance circuit, and wherein the detector is configured to apply an excitation signal causing oscillations to the resonance circuit, wherein the detector is configured to detect the impedance change from a measurement of at least one of a communication inductor voltage and a communication inductor current.

2. The power transmitter of claim 1, wherein the communication inductor is not a portion of a transmitter power coil, wherein the transmitter power coil generates the power transfer signal.

3. The power transmitter of claim 1, wherein the impedance change of the communication inductor generates an impedance change signal, wherein the impedance change signal comprises control data, wherein the transmitter mode controller is configured to adapt the transition from the standby mode to the power transfer mode based on the control data.

4. The power transmitter of claim 1, wherein the impedance change of the communication inductor occurs after a power-on user input.

5. A method of operation for a power transmitter, wherein the power transmitter is configured to provide a power transfer to a power receiver via a wireless inductive power transfer signal, wherein the wireless inductive power transfer signal is generated by the power transmitter in a power transfer mode, the method comprising:

operating the power transmitter in a standby mode, wherein a presence of the power receiver is detected but no power transfer signal is generated in the standby mode;

receiving a standby mode exit request at the power transmitter;

detecting an impedance change of a communication inductor, wherein the impedance change indicates the standby mode exit request to the power transmitter;

initiating a transition from the standby mode to the power transfer mode in response to the standby mode exit request, wherein the communication inductor is connected to a capacitor to form a resonance circuit; and applying an excitation signal, wherein the applying causes oscillations in the resonance circuit, wherein the detection of the impedance change is derived from a measurement of at least one of a communication inductor voltage and a communication inductor current.

6. The method of claim 5, further comprising arranging the transition from the standby mode to the power transfer mode based on a control data wherein the standby exit request comprises control data.

7. The method of claim 5, wherein the impedance change of the communication inductor occurs in response to receiving a power-on user input.

8. A computer program stored on a non-transitory medium, wherein the computer program when executed on a processor performs the method as claimed in claim 5.

* * * * *